US010009507B2

United States Patent
Hasegawa et al.

(10) Patent No.: US 10,009,507 B2
(45) Date of Patent: *Jun. 26, 2018

(54) IMAGE PROCESSING DEVICE

(71) Applicant: BROTHER KOGYO KABUSHIKI KAISHA, Nagoya, Aichi (JP)

(72) Inventors: Tomohiko Hasegawa, Okazaki (JP); Masaki Kondo, Toyoake (JP); Ryohei Ozawa, Nagoya (JP); Yoshiyuki Tanaka, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/420,401

(22) Filed: Jan. 31, 2017

(65) Prior Publication Data

US 2017/0142287 A1    May 18, 2017

Related U.S. Application Data

(63) Continuation of application No. 14/640,483, filed on Mar. 6, 2015.

(30) Foreign Application Priority Data

Mar. 6, 2014 (JP) ................................. 2014-044339

(51) Int. Cl.
*G09G 5/00* (2006.01)
*H04N 1/393* (2006.01)
(Continued)

(52) U.S. Cl.
CPC ......... *H04N 1/393* (2013.01); *G06K 15/1815* (2013.01); *H04N 1/00331* (2013.01);
(Continued)

(58) Field of Classification Search
CPC ... G06F 17/211; G06K 15/1815; H04N 1/393
(Continued)

(56) References Cited

U.S. PATENT DOCUMENTS 5,204,946 A  4/1993  Shimamura
6,067,070 A  5/2000  Suzuki et al.
(Continued)

FOREIGN PATENT DOCUMENTS

JP   H05-94511 A   4/1993
JP   H11-25283 A   1/1999
(Continued)

OTHER PUBLICATIONS

Automatic Line Feeding according to Screen Size!, Document File Displayed in Reader-Friendly Manner on Smartphone, Layout Rearranging Technology "GT-Layout", Starting Service for Online Storage Tool "Dropbox", New Development, May 30, 2012, Fujifilm Corporation, together with partial translation.
(Continued)

*Primary Examiner* — Ryan R Yang
(74) *Attorney, Agent, or Firm* — Scully, Scott, Murphy & Presser, P.C.

(57) ABSTRACT

An image processing device may judge whether to execute a first type of enlarging process or a second type of enlarging process based on M lines of letter strings in an original image, in a case of judging to execute the first type of enlarging process, generate a first type of processed image data indicating a first type of processed image by executing the first type of enlarging process, and in a case of judging to execute the second type of enlarging process, generate a second type of processed image data indicating a second type of processed image by executing the second type of enlarging process. A layout of the plurality of letters in the second type of processed image is different from a layout of the plurality of letters in the first type of processed image.

18 Claims, 18 Drawing Sheets

(51) Int. Cl.
  *G06K 15/02* (2006.01)
  *H04N 1/00* (2006.01)
  *H04N 1/04* (2006.01)
  *H04N 1/407* (2006.01)

(52) U.S. Cl.
  CPC .......... *H04N 1/00344* (2013.01); *H04N 1/04* (2013.01); *H04N 1/407* (2013.01); *H04N 2201/0094* (2013.01)

(58) Field of Classification Search
  USPC .................................. 345/660–671; 715/252
  See application file for complete search history.

(56) References Cited

U.S. PATENT DOCUMENTS

| | | | |
|---|---|---|---|
| 2006/0227153 A1* | 10/2006 | Anwar | G06T 3/0012 345/660 |
| 2009/0058885 A1 | 3/2009 | Park et al. | |
| 2011/0161806 A1* | 6/2011 | Stern | G06F 17/211 715/247 |
| 2012/0288190 A1* | 11/2012 | Tang | G06K 9/00 382/165 |
| 2013/0016127 A1 | 1/2013 | Takashima | |
| 2013/0298015 A1 | 11/2013 | Ogura | |
| 2014/0053050 A1 | 2/2014 | Yano | |

FOREIGN PATENT DOCUMENTS

| | | |
|---|---|---|
| JP | 2000-137801 A | 5/2000 |
| JP | 2002-374400 A | 12/2002 |
| JP | 2005-223824 A | 8/2005 |
| JP | 2010-183484 A | 8/2010 |
| JP | 2011-242987 A | 12/2011 |
| JP | 2012-108750 A | 6/2012 |
| JP | 2012-216038 A | 11/2012 |
| JP | 2012-230623 A | 11/2012 |

OTHER PUBLICATIONS

Notification of Reason for Refusal dated Apr. 25, 2017 received from the Japanese Patent Office in related application 2014-044339.

* cited by examiner

FIG. 5
(First Embodiment)
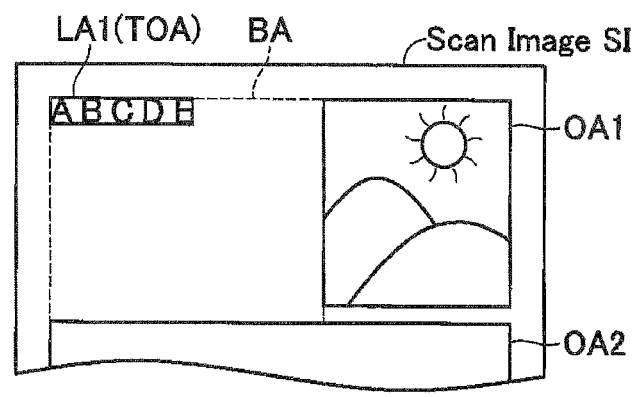
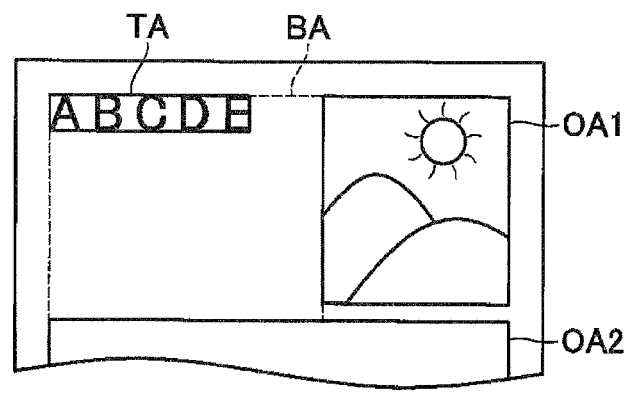

FIG. 8
Region Enlarging Process (S650 of FIG. 7)

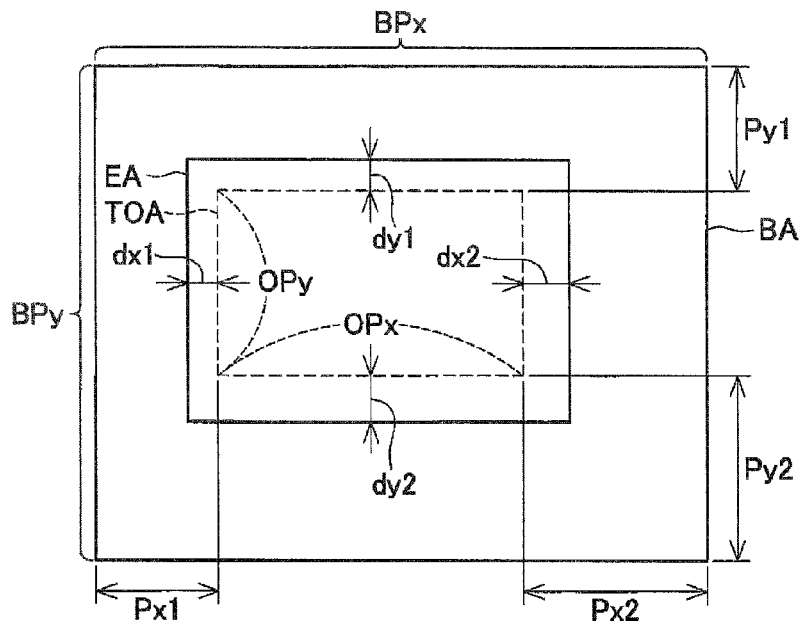

Area SO of TOA × ER = Area SC of EA ··· (1)

SO = OPx × OPy ··· (2)

SC = (OPx + dx1 + dx2) × (OPy + dy1 + dy2) ··· (3)

(OPx × OPy) × ER = (OPx + dx1 + dx2) × (OPy + dy1 + dy2) ··· (4)

dx1 = Px1 × K, dx2 = Px2 × K, dy1 = Py1 × K, dy2 = Py2 × K ··· (5)

(OPx × OPy) × ER = (OPx + K × (Px1 + Px2)) × (OPy + K × (Py1 + Py2)) ··· (6)

$$\underbrace{(Px1 + Px2) \times (Py1 + Py2) \times K^2}_{a} + \underbrace{[(Px1 + Px2) \times OPy + (Py1 + Py2) \times OPx] \times K}_{b}$$
$$+ \underbrace{OPx \times OPy - (OPx \times OPy) \times ER}_{c} = 0 \quad \cdots (7)$$

$$K = \frac{-b + \sqrt{b^2 - 4ac}}{2a} \quad \cdots (8)$$

(Case A)

FIG. 12 (Case B)

FIG. 14 (Third Embodiment)

(Fourth Embodiment)

$$\sum_{X=1}^{4} |\text{Average of BL} - \text{BLX}| \geq \text{Threshold}$$

(Fifth Embodiment)

Average of $LH \times K_2 \leq LH1$ (Sixth Embodiment)

(First Variant)

IMAGE PROCESSING DEVICE

CROSS-REFERENCE TO RELATED APPLICATIONS

This application is a continuation application of U.S. Ser. No. 14/640,483 filed on Mar. 6, 2015 and claims priority to Japanese Patent Application No. 2014-044339, filed on Mar. 6, 2014, the contents of each of which are hereby incorporated by reference into the present application.

TECHNICAL FIELD

The specification discloses an image processing device that executes an image processing on original image data indicating an original image including a plurality of letters to generate processed image data indicating a processed image including the plurality of letters.

BACKGROUND an image forming system including a DFE processor (abbreviation of Digital Front End Processor) device, a BEP (abbreviation of Back End Processor) device, and an image forming device is known. When image data is inputted from the DFE processor device, the BEP device enlarges letters in a letter region included in the image data, and generates image data of the letter region including the enlarged letters.

SUMMARY

Conventionally, letters in a letter region were enlarged normally using one method, and enlarging them by using different methods had not been considered at all.

The description provides a technique to suitably enlarge a plurality of letters included in image data.

An image processing device disclosed herein may comprise: one or more processors; and a memory storing computer readable instructions. The computer readable instructions, when executed by the one or more processors, may cause the image processing device to: acquire original image data indicating an original image, the original image including M lines of letter strings (the M being an integer of 1 or more) configured of a plurality of letters; and generate processed image data indicating a processed image by executing image processing on the original image data, the processed image having the plurality of letters expressed in an enlarged manner as compared to the original image. The image processing may include: judging whether to execute a first type of enlarging process or execute a second type of enlarging process based on the M lines of letter strings in the original image; in a case of judging to execute the first type of enlarging process, generating a first type of processed image data indicating a first type of processed image by executing the first type of enlarging process; and in a case of judging to execute the second type of enlarging process, generating a second type of processed image data indicating a second type of processed image by executing the second type of enlarging process. A layout of the plurality of letters in the first type of processed image may be equal to a layout of the plurality of letters in the original image, and the first type of processed image may include M lines of enlarged letter strings in which the plurality of letters is expressed in the enlarged manner, and a layout of the plurality of letters in the second type of processed image may be different from the layout of the plurality of letters in the original image, and the second type of processed image may include N lines of enlarged letter strings (the N being an integer of 1 or more) in which the plurality of letters is expressed in the enlarged manner.

Moreover, an image processing method executed by the image processing device, a computer program and a non-transitory computer-readable storage medium which stores the computer-readable instructions, for achieving the above image processing device, are also new and useful.

BRIEF DESCRIPTION OF DRAWINGS

FIG. 5 shows an explanatory diagram for explaining a case that satisfies a simple enlargement condition of a first embodiment;
FIG. 8 shows an explanatory diagram for explaining a region enlarging process.

DETAILED DESCRIPTION

Figure 1:
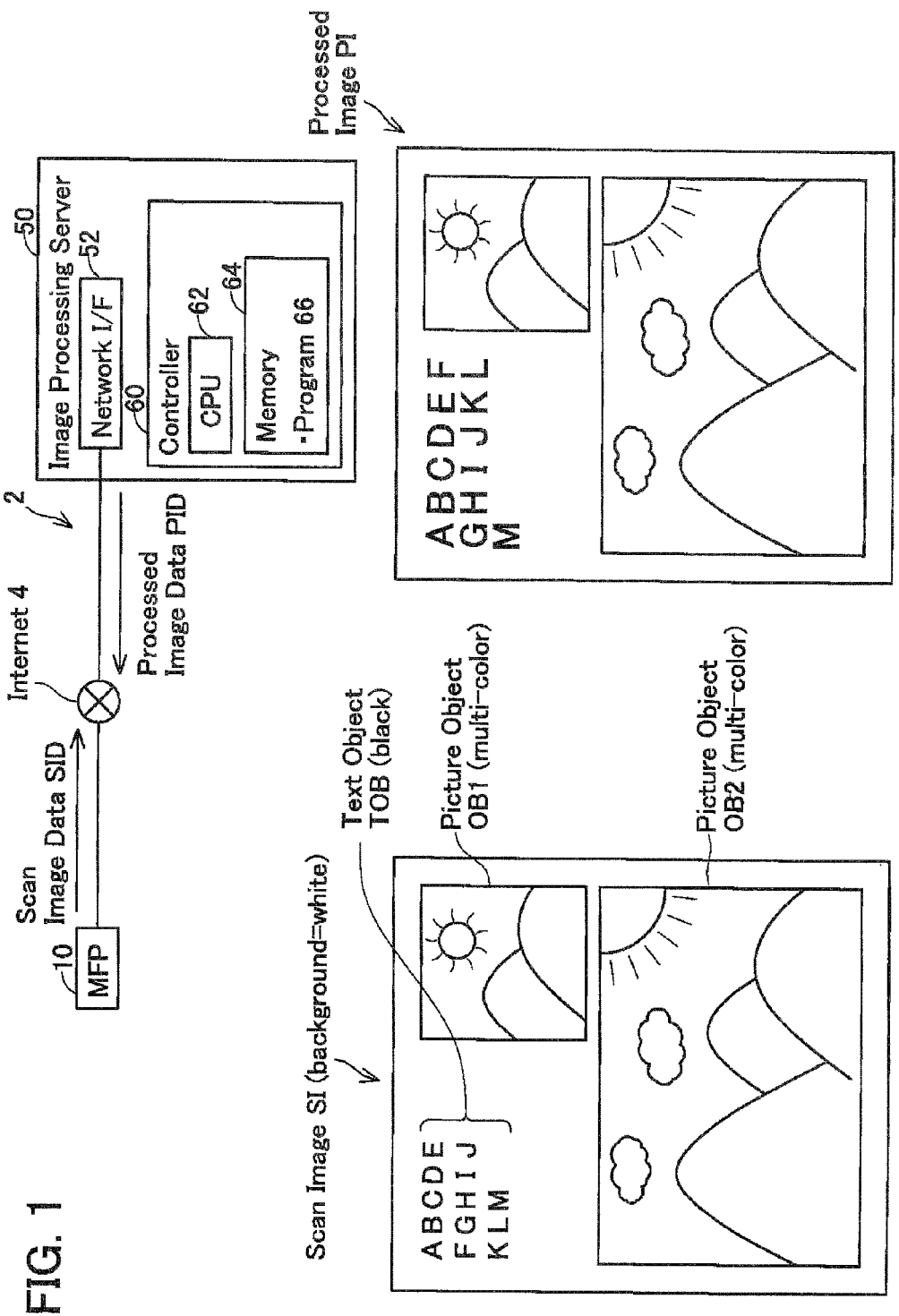
FIG. 1 shows a configuration of a communication system.

First Embodiment (Configuration of Communication System 2)
As shown in FIG. 1, a communication system 2 includes a multi function peripheral 10 (which may be denoted as 'MFP 10') and an image processing server 50. The multi function peripheral 10 and the image processing server 50 are configured communicable with each other via the Internet 4. The multi function peripheral 10 is a peripheral device that is capable of executing multiple functions including print function, scan function, copy function, FAX function, and the like (i.e., it is a peripheral device for a PC (Personal Computer) that is not shown). The image processing server 50 is a server provided on the Internet 4 by a vendor or manufacturer of the multi function peripheral 10.

(Overview of Processes Executed by Multi Function Peripheral 10)

The copy function that the multi function peripheral 10 can execute is classified into a monochrome copy function and a color copy function, and the description of the present embodiment will be given by focusing on the color copy function. The color copy function is classified into a normal color copy function and a letter-enlarging color copy function. In both cases where an execution instruction provided from a user is for the normal color copy function or the letter-enlarging color copy function, the multi function peripheral 10 firstly color scans a sheet showing an image that is a scan target (hereafter referred to as 'scan target sheet'), and creates scan image data SID. The scan image data SID is RGB bit map data in multilevel (e.g., grayscale of 256 levels).

A scan image SI indicated by the scan image data SID (that is, the image shown on the scan target sheet) has a white background, one text object TOB, and two picture objects OB1, OB2. The text object TOB includes a letter string including three lines configured of a plurality of black letters "A to M". The color of the letters may be a color different from black (e.g., red). The picture objects OB1, OB2 do not include letters, but include pictures configured of a plurality of colors.

Hereinbelow, a plurality of scan images SI, SI2 to SI6 (see FIG. 5 and FIGS. 13 to 17) with different letter strings included in the text object TOB will be exemplified. The scan images SI, SI2 to SI6 are indicated by scan image data that are RGB bit map data in multilevel (e.g., grayscale of 256 levels), similar to the scan image SI.

Further, in each drawing of the present embodiment, the letter strings configuring the respective text objects TOB are expressed by alphabets "A to M" arranged in a regular order, however, in actuality the letter strings configure a part of or an entirety of a sentence. In each letter string (i.e., one line of letter string), the sentence progresses from a left side toward a right side laterally within the scan image SI. Further, in three lines of letter strings "A to M", the sentence progresses from an upper side toward a lower side vertically within the scan image SI. In all of the images below (for example, a processed image PI), a direction along which a plurality of letters configuring one line of letter string is arranged, and a direction vertically intersecting the aforementioned direction are called a "horizontal direction" and a "vertical direction", respectively. Further, since the sentence progresses from the left side toward the right side, a left end and a right end in the horizontal direction are respectively called a "fore end" and a "rear end".

In a case where the execution instruction for the normal color copy function is provided from the user, the multi function peripheral 10 uses the scan image data SID to print the image on a sheet (hereinbelow referred to as 'print target sheet') in accordance with a copy magnification set by the user. For example, when no magnification is set (when the copy magnification is equal to an original size), the multi function peripheral 10 prints an image having the same size as the image shown on the scan target sheet on the print target sheet. Further, for example, when the copy magnification is a value indicating enlargement of the image, the multi function peripheral 10 prints an image having a size larger than the image shown on the scan target sheet on the print target sheet. In this case, for example, the image shown on the A4-sized scan target sheet is enlarged, and is printed on an A3-sized print target sheet. As a result, an image in which all of the three objects TOB, OB1, OB2 are shown by being enlarged is printed on the print target sheet.

On the other hand, in a case where the execution instruction for the letter-enlarging color copy function is provided from the user, the multi function peripheral 10 sends the scan image data SID to the image processing server 50 via the Internet 4. Due to this, the multi function peripheral 10 receives processed image data PID from the image processing server 50 via the Internet 4, and prints a processed image PI indicated by the processed image data PID on the print target sheet. Specifically, the multi function peripheral 10 prints the processed image PI having the same size as the scan target sheet (e.g., A4 size) on the print target sheet.

As in FIG. 1, in the processed image PI as compared to the scan image SI, the picture objects OB1, OB2 are not enlarged, but the text object TOB is expressed by being enlarged. Thus, even if the size of the letters in the scan image SI is small, the processed image PI can make the size of the letters large, whereby the user can easily see the letters in the processed image PI. That is, in the letter-enlarging color copy function, only the letters are enlarged on the premise of obtaining images of the same size, instead of generating processed image data corresponding to an image with a size different from the scan image, as in the normal color copy function.

(Configuration of Image Processing Server 50)

Figure 2:
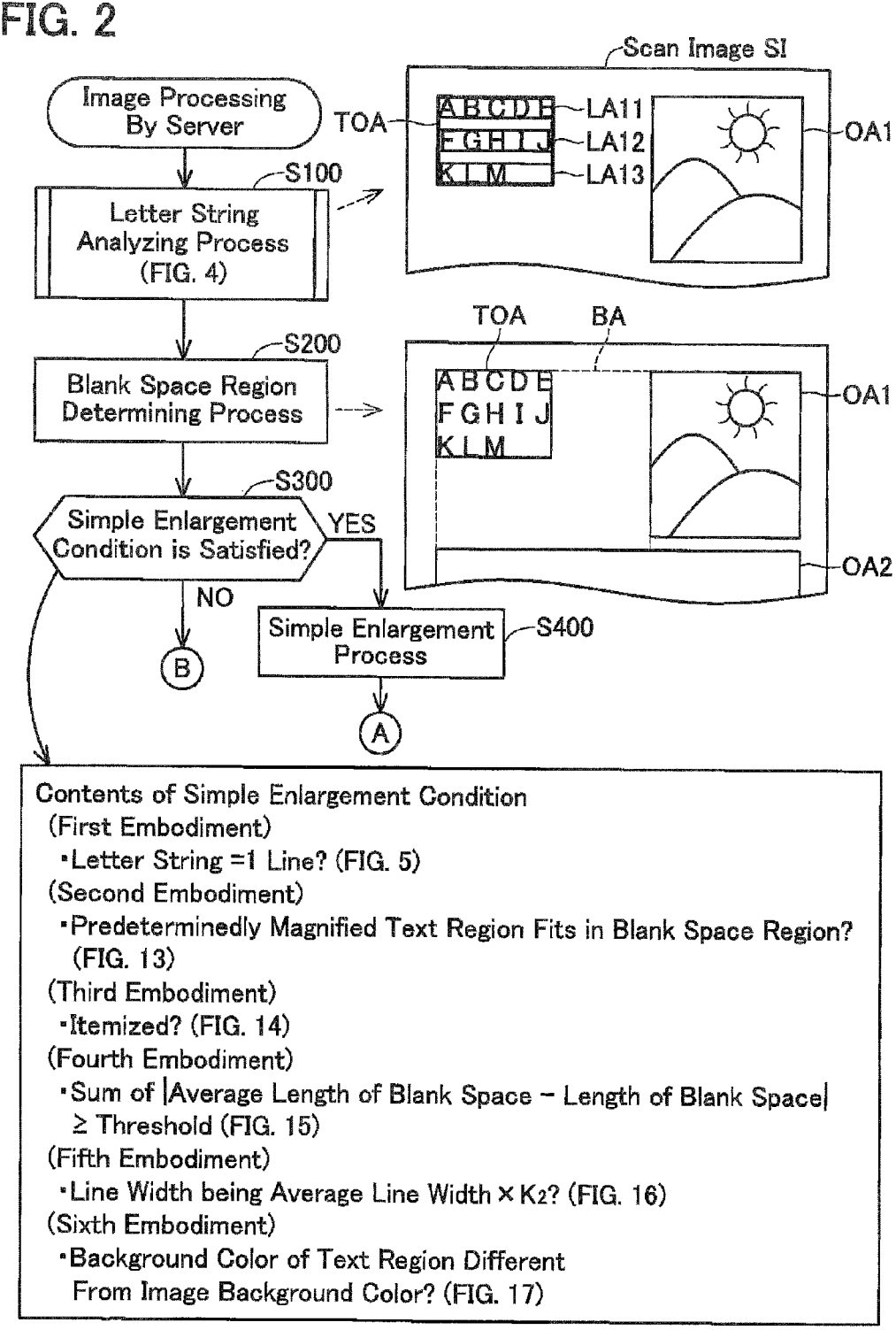
FIG. 2 shows a flowchart of a process by an image processing server.

The image processing server 50 executes image processing on the scan image data SID received from the multi function peripheral 10 to generate the processed image data PID, and sends the processed image data PID to the multi function peripheral 10. The image processing server 50 includes a network interface 52 (interface herein may be denoted as 'I/F'), and a controller 60. The network interface 52 is connected to the Internet 4. The controller 60 includes a CPU 62 and a memory 64. The CPU 62 is a processor that executes various processes (i.e., processes as shown in FIG. 2, etc.) in accordance with program 66 stored in the memory 64.

(Processes Executed by Image Processing Server 50; FIG. 2)

Next, by referring to FIG. 2, contents of processes executed by the CPU 62 of the image processing server 50 will be described. The CPU 62 activates the process of FIG. 2 in a case where the scan image data SID is received from the multi function peripheral 10 via the Internet 4.

In S100, the CPU 62 executes a letter string analyzing process (see FIG. 4 described later) to determine a text object region (hereafter simply denoted 'text region') TOA including three lines of letter strings "A to M" in the scan image SI. Then, the CPU 62 determines three band-shaped regions LA1 to LA3 including three lines of letter strings in the text region TOA.

In S200, the CPU 62 executes a blank space region determining process to determine a blank space region BA within the scan image SI. The blank space region BA encompasses the text region TOA, and has a size (i.e., area) larger than a size of the text region TOA. The CPU 62 determines a blank space region BA that does not overlap with other objects (e.g., picture objects OA1, OA2) in accordance with a size of a blank space around the text region TOA. For example, in the scan image SI, since there is a large blank space to the right and below the text region TOA, a blank space region BA having a rectangular shape that extends downward and rightward from the text region TOA is hereby determined. An aspect ratio of the blank space region BA normally differs from an aspect ratio of the text region TOA. The blank space region BA in the scan image SI includes a target region TA (see processed image PI in S800) in the processed image PI. The process of S200 is equivalent to a process of determining a range that allows maximum enlargement of the text region TOA in the processed image PI. Notably, the target region TA in the processed image PI described later is a region in which the letter strings "A to M", shown by being enlarged, are supposed to be arranged.

In S300, the CPU 62 judges whether or not the text object TOB included in the scan image SI satisfies a simple enlargement condition. Specifically, the CPU 62 judges that the simple enlargement condition is satisfied in judging that the text object TOB include only one line of letter string, and judges that the simple enlargement condition is not satisfied in judging that the text object TOB include two or more lines of letter strings. Aside from the simple enlargement condition used in the first embodiment (i.e., "letter string=1 line?"), FIG. 2 also describes contents of simple enlargement conditions used in second to sixth embodiments.

In S300, in a case of judging that the simple enlargement condition is satisfied (YES to S300), the CPU 62 executes a simple enlargement process (see FIG. 5 described later) in S400 to generate the processed image data PID. On the other hand, in a case of judging that the simple enlargement condition is not satisfied (NO to S300), the CPU 62 proceeds to S500 of FIG. 3.

In S500, the CPU 62 executes a coupling process (see FIG. 6 described later) to generate coupled image data indicating one coupled image CI. The coupled image CI includes one line of letter string "A to M", in which the three lines of letter strings included in three band-shaped regions LA1 to LA3 are linearly coupled (i.e., joined) in the horizontal direction.

In S600, the CPU 62 executes a target region determining process (see FIG. 7 described later) to determine the target region TA in the scan image SI (see rearranged image RI in S700). The target region TA in the scan image SI matches a target region TA in the processed image PI (see processed image PI in S800). Thus, the process of S600 is equivalent to a process of determining the target region TA in the processed image PI.

In S700, the CPU 62 executes a rearranging process (see FIG. 9 described later). The CPU 62 generates rearranged image data indicating a rearranged image RI by determining the rearranged region RA, and rearranging the plurality of letters "A to M" within the rearranged region RA by using the coupled image data indicating the coupled image CI.

Figure 11:
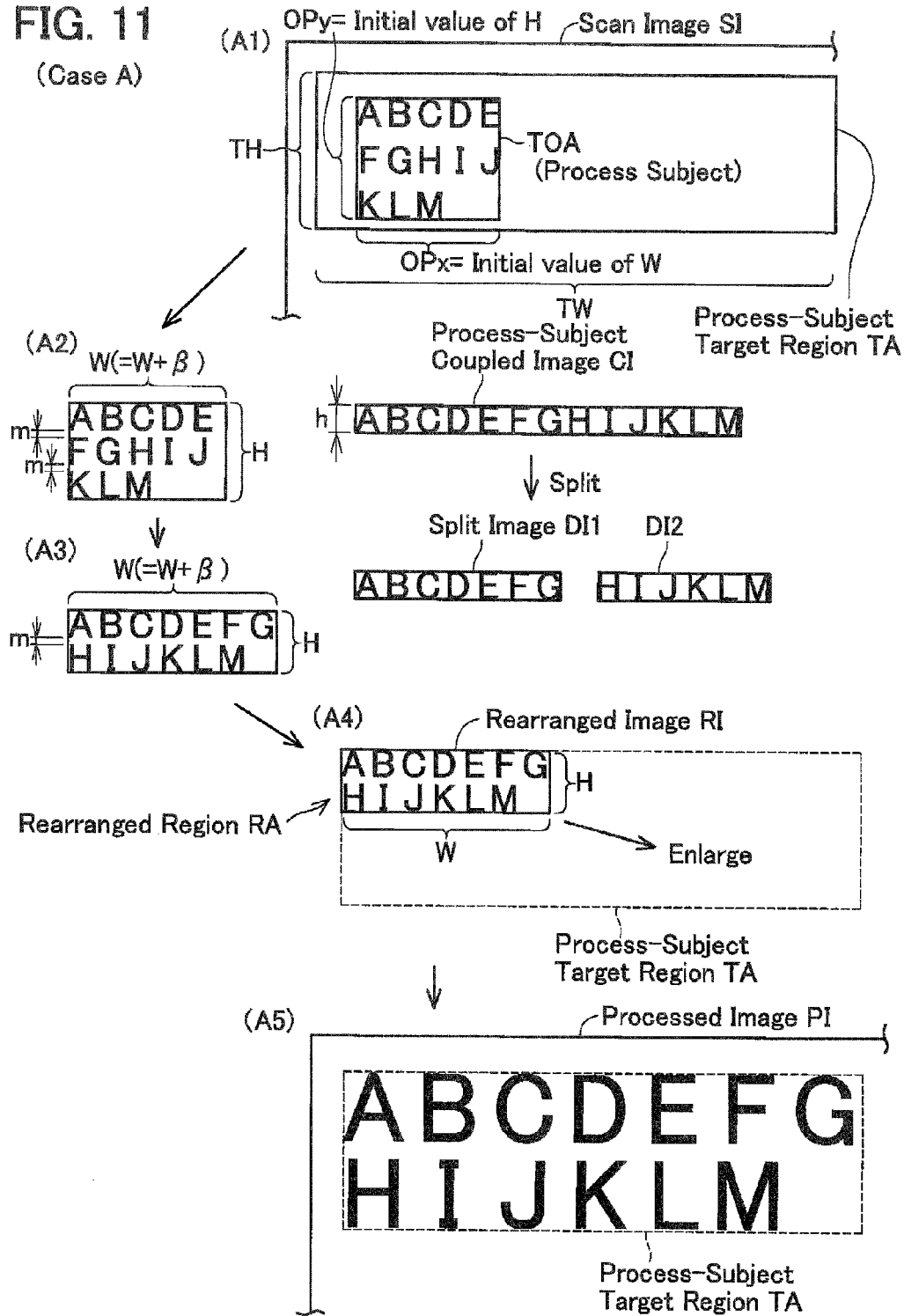
FIG. 11 shows an explanatory diagram for explaining a case A in which respective letters are rearranged and enlarged.
Figure 12:
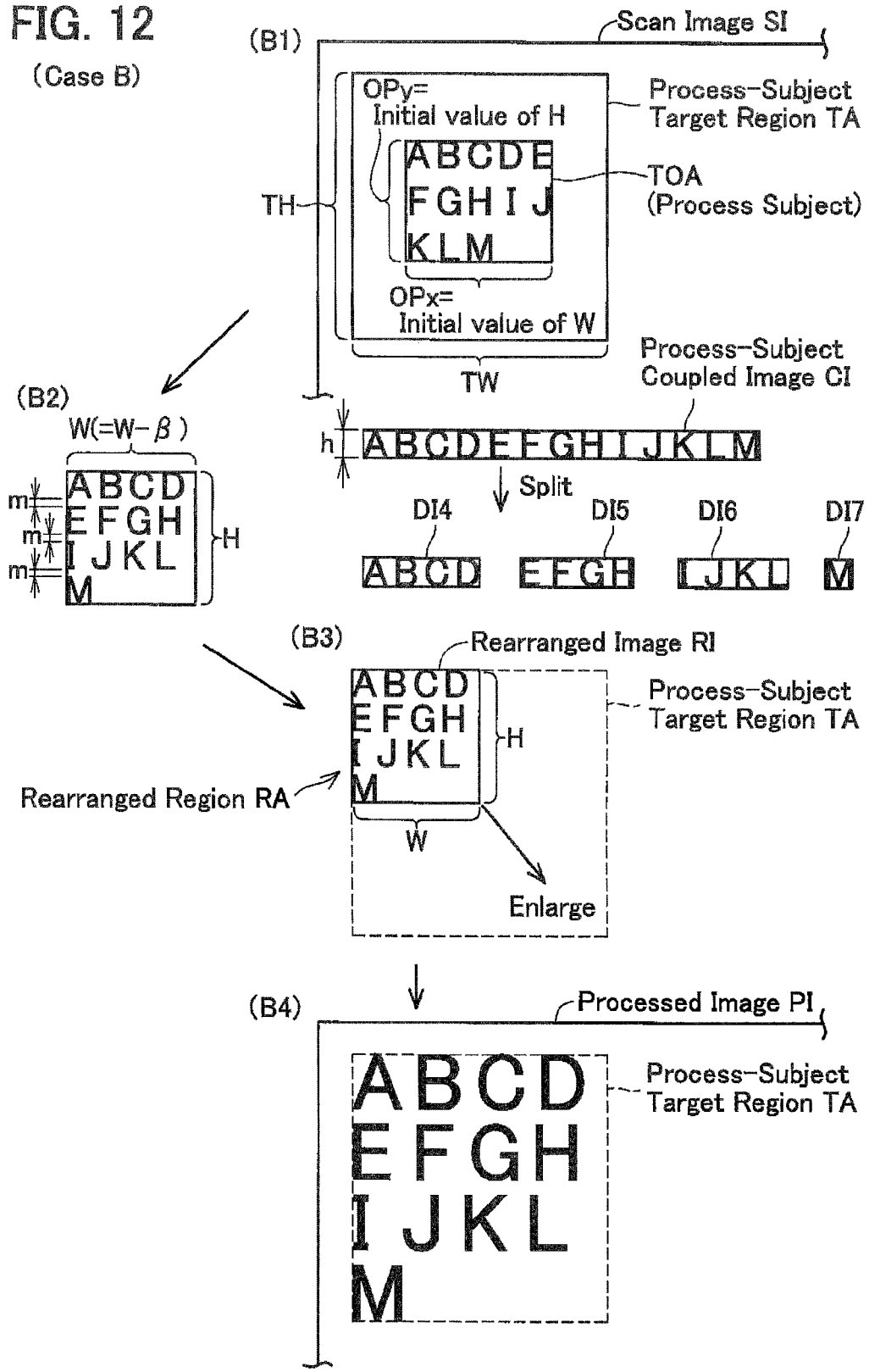
FIG. 12 shows an explanatory diagram for explaining a case B in which respective letters are rearranged and enlarged.

In S800, the CPU 62 executes an enlarging process (see FIG. 11 and FIG. 12 described later). Enlarged image data is generated by enlarging the rearranged image data indicating the rearranged image RI to the target region TA. Then, the CPU 62 uses the enlarged image data to generate the processed image data PID indicating the processed image PI. The respective letters are shown by being enlarged in the processed image PI, however, the processed image data PID has a same number of pixels as the scan image data SID.

In S900, the CPU 62 sends the processed image data PID to the multi function peripheral 10 via the Internet 4. Due to this, the processed image PI indicated by the processed image data PID is printed on the print target sheet.

Figure 4:
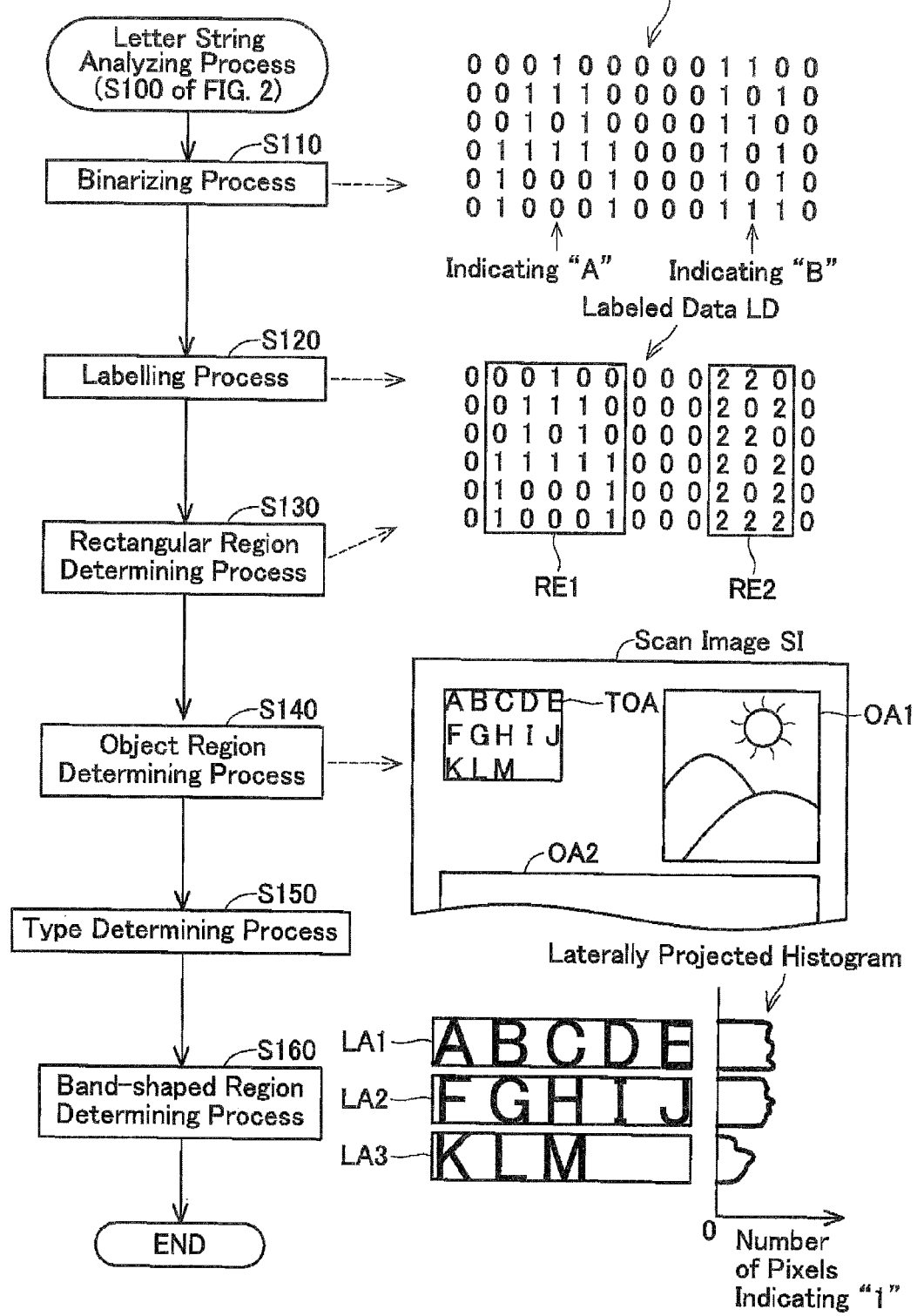
FIG. 4 shows a flowchart of a letter string analyzing process.

(Letter String Analyzing Process; FIG. 4)

Next, by referring to FIG. 4, the contents of the letter string analyzing process executed in S100 of FIG. 2 will be described. In S110, the CPU 62 executes a binarizing process on the scan image data SID to generate binary data BD (only a part of which is shown in FIG. 4) having the same number of pixels as the scan image data SID. Specifically, the CPU 62 firstly determines a background color of the scan image SI (which is white in the present embodiment) by using the scan image data SID. Specifically, the CPU 62 generates a histogram showing a distribution of frequencies of pixel values of a plurality of pixels in the scan image data SID. Then, the CPU 62 uses the histogram to specify the pixel value with a maximum frequency (which is hereafter denoted 'most frequent pixel value to determine the background color. Note, the "frequency" means how often the pixel value appears. Next, for each of the plurality of pixels in the scan image data SID, the CPU 62 allots "0" as the pixel value of the pixel in the in the scan image data SID existing at a position corresponding to a pixel in a case where the pixel value of the pixel matches the most frequent pixel value, and allots "1" as the pixel value of the pixel in the in the scan image data SID existing at a position corresponding to a pixel in a case where the pixel value of the pixel does not match the most frequent pixel value. As a result, the binary data BD configured of pixels having the pixel values of "0" and "1" corresponding to the scan image data SID is generated. In the binary data BD, each of the pixels indicating each letter (e.g., "A", "B") included in the text object TOB indicates the pixel value "1", each of the pixels indicating each picture object OB1, OB2 indicates the pixel value "1", and pixels other than the aforementioned (i.e., pixels indicating the background) indicate the pixel value "0". Hereinbelow, the pixel indicating the pixel value "1" and the pixel indicating the pixel value "0" in the binary data BD are respectively called "ON pixel" and "OFF pixel".

In S120, the CPU 62 executes a labelling process on the binary data BD generated in S110 to generate labeled data LD (only a part of which is shown in FIG. 4) having a same number of pixels as the binary data BD. Specifically, the CPU 62 divides the plurality of ON pixels in the binary data BD into one or more ON pixel groups, and allots different pixel values (e.g., "1", "2", etc.) to each of the one or more ON pixel groups. Each ON pixel group is configured of one or more ON pixels being adjacent one another. That is, in a case where one or more ON pixels are included in eight adjacent pixels that are adjacent to the one ON pixel being the target of the labelling process, the CPU 62 classifies the targeted one ON pixel and the one or more ON pixels included in the eight adjacent pixels as being of the same ON pixel group (i.e., groups accordingly). The CPU 62 determines the one or more ON pixel groups by sequentially executing the grouping of the respective ON pixels while changing the ON pixel being the target of the labelling process. For example, in the labeled data LD of FIG. 4, the pixel value "1" is allotted to the respective ON pixels indicating the letter "A" (i.e., to one ON pixel group), and the pixel value "2" is allotted to the respective ON pixels indicating the letter "B" (i.e., to another ON pixel group).

In S130, the CPU 62 determines each unit region corresponding to each of the ON pixel groups by using the labeled data LD generated in S120. Each of the unit regions is a rectangular region that circumscribes the corresponding one ON pixel group. In the case of using the labeled data LD in FIG. 4, for example, the CPU 62 determines a unit region RE1 circumscribing the ON pixel group allotted with the pixel value "1" (i.e., a unit region corresponding to the letter "A") and a unit region RE2 circumscribing the ON pixel group allotted with the pixel value "2" (i.e., a unit region corresponding to the letter "B"). More specifically, the CPU 62 determines fifteen unit regions, namely thirteen unit regions corresponding to the thirteen letters "A" to "M", two unit regions corresponding to the two picture objects OB1, OB2, from among the scan image SI. The determination of a unit region is executed by storing positions of respective pixels configuring apexes of the unit region in the memory 64. However, hereinbelow, in the description related to "determination of region (or position)", description on storing the position of the pixel in the memory 64 will be omitted.

In S140, the CPU 62 determines a plurality of object regions in the scan image SI using the fifteen unit regions determined in S130. Specifically, the CPU 62 classifies the fifteen unit regions into a plurality of unit region groups, and determines each of object regions corresponding to each unit region group. One unit region group is configured of one or more unit regions existing close to each other. In a case where a distance between two unit regions (i.e., number of pixels) is less than a predetermined distance, the CPU 62 classifies the two unit regions in the same unit region group. The predetermined distance is set in advance according to resolution of the scan image data SID. For example, in the present embodiment, the scan image data SID has the resolution of 300 dpi, and the predetermined distance corresponding to the resolution of 300 dpi is 10 pixels. Further, in the labeled data LD in FIG. 4, a distance between the unit region RE1 corresponding to the letter "A" and the unit region RE2 corresponding to the letter "B" is 3 pixels. Thus, the CPU 62 classifies the unit region RE1 and the unit region RE2 in the same unit region group. Due to this, the CPU 62 can group the letters existing close to each other, that is, the letters configuring the same sentence. More specifically, the CPU 62 determines three unit region groups for the scan image SI, namely a unit region group including thirteen unit regions corresponding to the thirteen letters "A" to "M" in the text object TOB, a unit region group including the unit region corresponding to the picture object OB1, and a unit region group including the unit region corresponding to the picture object OB2. Then, the CPU 62 determines a rectangular region that circumscribes the unit region group as the object region, for each of the three unit region groups. That is, the CPU 62 determines a region that contains the pixel arranged at a same positon as the image included in each of the object regions determined using the labeled data LD, from among the scan image data SID, respectively as each of the three object regions, namely the object region TOA including the thirteen letters "A" to "M" in the text object TOB, the object region OA1 including the picture object OB1, and the object region OA2 including the picture object OB2.

In S150, the CPU 62 determines a type of the object region for each of the three object regions TOA, OA1, OA2 determined in S140. Specifically, the CPU 62 judges whether or not each of the object regions TOA, OA1, OA2 is a text region containing letters. The CPU 62 firstly generates a histogram showing a distribution of frequency of pixel values of a plurality of pixels configuring partial image data indicating the object region TOA among the scan image data SID. Then, the CPU 62 uses the histogram to calculate a number of pixel values of which frequency is greater than zero (i.e., number of colors used in the object region TOA). The CPU 62 judges that the object region OA1 is a text region in a case where the calculated value is less than a predetermined number (e.g., "1.0"), and judges that the object region OA1 is not a text region in a case where the calculated value is equal to or more than the predetermined number. The object region TOA of the present embodiment includes black letters "A" to "M" and white background. Accordingly, in the histogram corresponding to the object region TOA, normally, frequencies of only two pixel values including the pixel value indicating black color and the pixel value indicating white color are larger than zero. Thus, the CPU 62 judges that the object region TOA is a text region. On the other hand, for example, in the picture object OA1, normally, 10 or more colors are used. Thus, in the histogram corresponding to the object region OA1, normally, the number of pixel values of which frequencies are larger than zero adds up to be equal to or more than the predetermined number. Thus, the CPU 62 judges that the object region OA1 is not a text region but a picture object region. Similarly, the CPU 62 judges that the object region OA2 is a picture object region by using the histogram corresponding to the object region OA2.

In S160, the CPU 62 executes a band-shaped regions determining process on the one text region TOA determined in S150. However, the CPU 62 does not execute the band-shaped regions determining process on the picture object regions OA1, OA2. Specifically, the CPU 62 firstly generates a projected histogram corresponding to the text region TOA. The projected histogram shows a distribution of frequency of the ON pixels (i.e., pixels indicating "1") in a case of projecting each pixel representing the text region TOA in a horizontal direction, among the plurality of pixels configuring the binary data BD (see S110). In other words, the projected histogram shows a distribution of frequency of letters in a case of projecting each pixel representing the text region TOA of the scan image data SID in the horizontal direction. In the projected histogram, one line of letter string is shown by a range in which frequency is greater than zero (hereinbelow denoted 'high frequency range'), and a space between two lines of letter strings is indicated by a range with zero frequency. Further, the CPU 62 uses the projected histogram to determine one or more band-shaped regions corresponding to the one or more high frequency range. A length of one band-shaped region in the vertical direction (i.e., number of pixels in the vertical direction) is equal to a length of a high frequency range corresponding to the band-shaped region in the vertical direction. Further, a length of one band-shaped region in the horizontal direction (i.e., number of pixels in the horizontal direction) is equal to a length of the object region OA1 in the horizontal direction. Due to this, three band-shaped regions, namely a band-shaped region LA1 including the letter string "A to E", a band-shaped region LA2 including the letter string "F to J", and a band-shaped region LA3 including the letter string "K to M", are determined from among the text region TOA. The process of FIG. 4 ends when S160 ends.

(Simple Enlargement Process; FIG. 5)

Next, by referring to FIG. 5, an example of a scan image SI satisfying the simple enlargement condition executed in S300 of FIG. 2 and contents of the simple enlargement process executed in S400 of FIG. 2 will be described. In S160 of the aforementioned letter string analyzing process (see FIG. 4), the band-shaped regions were determined. In the scan image SI shown in FIG. 2, three band-shaped regions LA1 to LA3 are determined from among one text region TOA. In a case where two or more band-shaped regions are determined from one text region, the CPU 62 judges that there are two or more lines of letter strings included in the text region (NO to S300 in FIG. 2), and proceeds to S500.

On the other hand, as shown in FIG. 5, in a case where only one band-shaped region is determined from one text region (i.e., there is only band-shaped region LA1), the CPU 62 judges that there is one line of letter string included in the text region TOA (YES to S300 in FIG. 2), and proceeds to S400.

In the simple enlargement process of S400, the CPU 62 judges whether or not an area of the text region TOA can be enlarged to a target magnification (e.g., "1.4") set in advance in the image processing server 50. According to experiments, it has been empirically found that in general, human can easily identify enlarged letters even if the original letters are small, if the size of the letters is enlarged to 1.4 times. Accordingly, the enlargement rate that human can easily identify is set as the aforementioned target magnification.

The CPU 62 judges whether or not a region in which the area of the text region TOA has been enlarged without changing the aspect ratio of the text region TOA in the scan image SI (hereafter denoted as "simply enlarged region") can fit in the blank space region BA. Specifically, the CPU 62 multiplies a square root of the target magnification (e.g., √1.4) to each of the length in the vertical direction and the length in the horizontal direction of the text region TOA, and determines the same as a length in the vertical direction and a length in the horizontal direction of the simply enlarged region. The CPU 62 judges that the simply enlarged region can fit in the blank space region BA in a case where the length of the simply enlarged region in the vertical direction is smaller than the length of the blank space region BA in the vertical direction, and the length of the simply enlarged region in the horizontal direction is smaller than the length of the blank space region BA in the horizontal direction. On the other hand, the CPU 62 judges that the simply enlarged region cannot fit in the blank space region BA in a case where the length of the simply enlarged region in the vertical direction is larger than the length of the blank space region BA in the vertical direction, or the length of the simply enlarged region in the horizontal direction is larger than the length of the blank space region BA in the horizontal direction.

The CPU 62 judges that enlargement by the target magnification is possible in the case of judging that the simply enlarged region can fit in the blank space region BA, and sets the simply enlarged region as the target region TA of the text region TOA.

On the other hand, the CPU 62 judges that enlargement by the target magnification (e.g., "1.4") is impossible in the case of judging that the simply enlarged region cannot fit in the blank space region BA. In this case, the CPU 62 determines a simply enlarged region that would be maximized and fit in the blank space region BA without changing the aspect ratio of the text region TOA as the target region TA of the text region TOA. Specifically, the CPU 62 gradually enlarges the text region TOA along a diagonal line of the text region TOA in a lower right direction. The CPU 62 determines the simply enlarged region generated by enlarging the text region TOA to a position where one of the right edge or lower edge of the simply enlarged region overlaps with the right edge or lower edge of the blank space region BA as the target region TA.

Next, the CPU 62 enlarges the text object data indicating the text object TOB using the determined target region TA, and generates enlarged image data indicating an enlarged image. Specifically, pixel is supplemented in the text object data indicating the text object TOB, the text object TOB is enlarged so that it overlaps with the right edge and lower edge of the target region TA determined in the direction along which the diagonal line of the text region TOA extends, as a result of which the enlarged image data indicating the enlarged image is generated. Next, the CPU 62 overwrites the enlarged image data in the blank space region BA of the scan image data SID. Specifically, the CPU 62 overwrites the enlarged image data so that a left edge and upper edge of the target region TA respectively overlap with a left edge and upper edge of the blank space region BA. As a result, processed image data PID indicating a processed image PI is completed.

By the foregoing simple enlargement process, enlargement to the target region TA can be performed while maintaining the aspect ratio of the text region TOA. Further, layouts of the plurality of letters "A to E" included in the text region TOA is equal to layouts of the plurality of letters "A to E" included in the target region TA after the enlargement. The "layouts being the same" herein means that, when the plurality of letters configuring the M lines of letter strings (M being an integer of 1 or more) included in the text region TOA and the plurality of letters configuring the M lines of letter strings included in the target region TA after the enlargement are compared, a number of letters is the same, magnification of each letter is the same, magnification of spaces between the letters is the same, and magnification of spaces between the lines is the same. Moreover, "layout being the same" herein also means that, when a partial image in a circumscribing rectangle (i.e., text region TOA) of the text object TOB in the scan image SI is enlarged, it matches with a partial image in the target region TA including the text object within the enlarged image in the processed image data.

Figure 6:
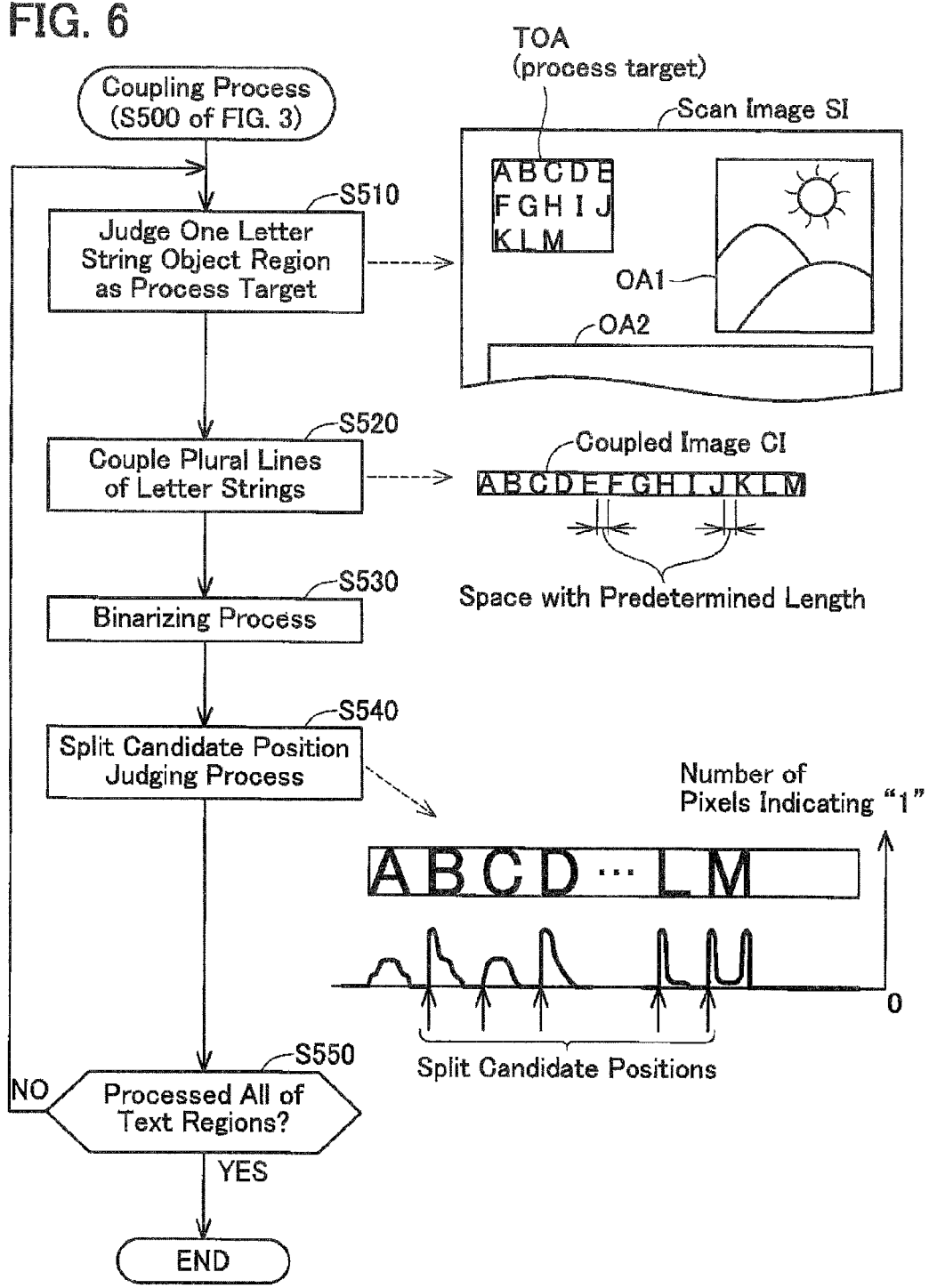
FIG. 6 shows a flowchart of a coupling process.

(Coupling Process: FIG. 6)

Next, by referring to FIG. 6, contents of the coupling process executed in S500 of FIG. 3 will be described. In S510, the CPU 62 determines one text region (hereinbelow denoted as "process-subject text region") among the one or more text regions within the scan image SI. Hereinbelow, a case where the text region TOA is determined as the process-subject text region will be exemplified.

In S520, the CPU 62 generates coupled image data indicating a coupled image CI in which three lines of letter strings "A to M" included in the text region TOA are coupled. Specifically, the CPU 62 acquires three partial image data indicating three band-shaped regions LA1 to LA3 (see S160 of FIG. 4) determined for the text region TOA from the scan image data SID. Then, the CPU 62 couples the acquired three partial image data so that the three lines of letter strings "A to M" in the three band-shaped regions LA1 to LA3 are coupled linearly along the horizontal direction, to thereby generate the coupled image data indicating the coupled image CI. Upon this occasion, the CPU 62 generates the coupled image data by supplementing pixels indicating spaces, i.e., pixels having background color of the scan image SI so that spaces with predetermined length in the horizontal direction are formed between the two letter strings as coupled (i.e., space between "E" and "F", and space between "J" and "K"). That is, the CPU 62 couples three partial image data via the supplemented pixels to generate the coupled image data indicating the coupled image CI. Notably, to delete the space on a rear end side of the band-shaped region LA3 (i.e., space existing on the right side than the letter string "K to M"), the CPU 62 deletes the data indicating such a space within the partial image data indicating the band-shaped region LA3. Due to this, the coupled image data indicating the coupled image CI in which no space exists on the rear end side than the letter string "A to M" is generated.

In S530, the CPU 62 performs binarizing process on the coupled image data generated in S520. Contents of the binarizing process are identical to S110 of FIG. 4.

In S540, the CPU 62 uses the binary data generated in S530 to determine a plurality of split candidate positions in the coupled image data generated in S520. The split candidate positions are candidates of split positions for splitting the coupled image data in a rearranging process (S700 of FIG. 3, and FIG. 9 to be described later). Firstly, the CPU 62 uses the binary data to generate a projected histogram. The projected histogram indicates a distribution of frequency of the ON pixels (i.e., letter-configuring pixels) in the case of projecting each pixel configuring the binary data in the vertical direction. In the projected histogram, one letter (for example, "A") is indicated by a range with frequency larger than zero, and a space portion between two letters (for example, the space portion between "A" and "B") is indicated by a range with frequency of zero (hereafter denoted as "zero frequency range"). Further, the CPU 62 uses the projected histogram to determine a right end of each zero frequency range as the split candidate position. Accordingly, the space portion between two letters is determined as the split candidate position, so one letter (for example, "A") can be prevented from being split in the middle. Notably, in modified embodiments the CPU 62 may determine a left end of each zero frequency range as the split candidate position, or may determine an intermediate position of each zero frequency range as the split candidate position.

In S550, the CPU 62 judges whether or not the processes of S510 to S540 have been finished for all of the text regions. In a case of judging that the processes are not yet finished (NO to S550), the CPU 62 determines an unprocessed text region as the process target in S510. In a case of judging that the processes are finished (YES to S550), the CPU 62 ends the process of FIG. 6.

Figure 7:
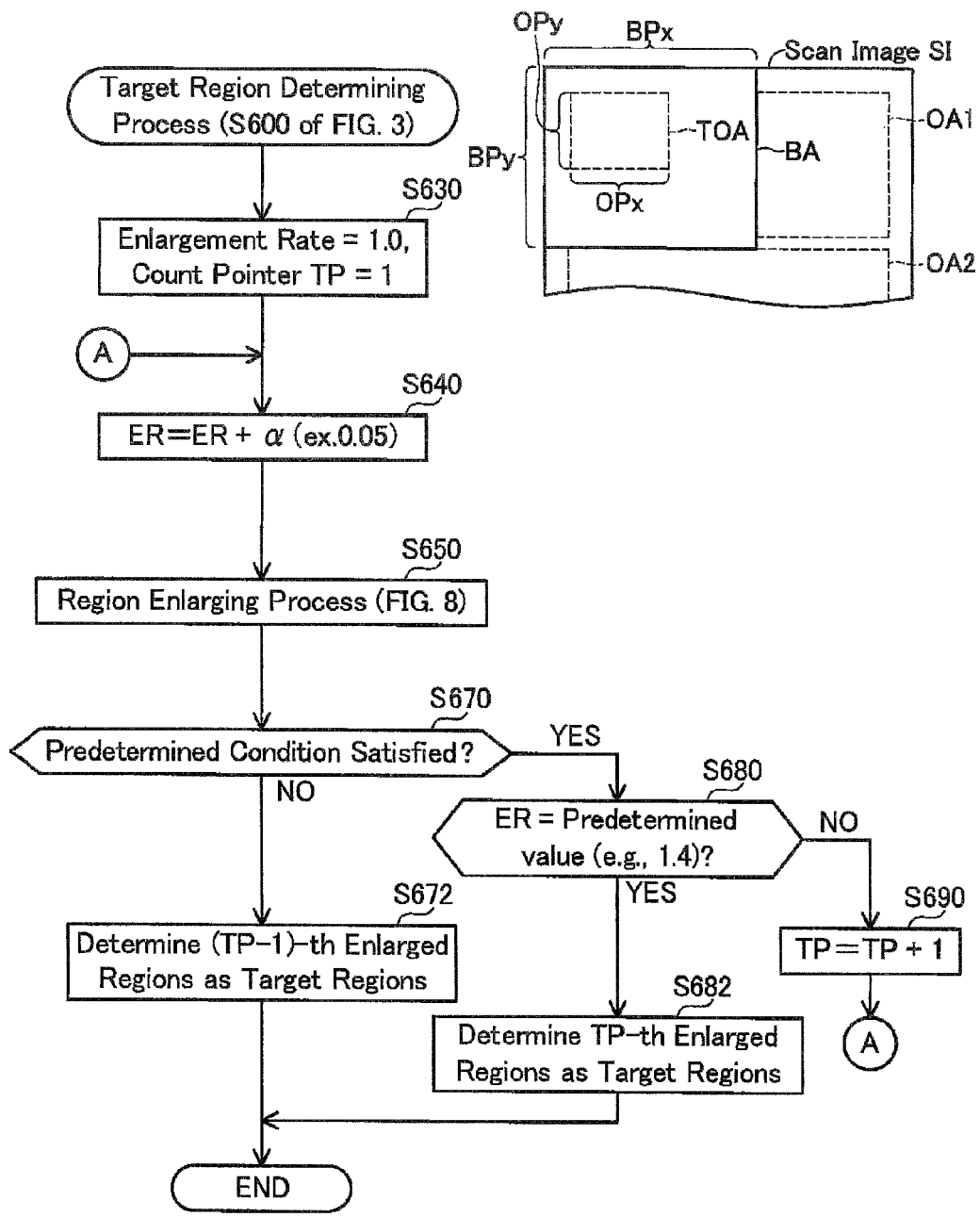
FIG. 7 shows a flowchart of a target region determining process.

(Target Region Determining Process; FIG. 7)

Next, by referring to FIG. 7, contents of the target region determining process executed in S600 of FIG. 3 will be described. In S630, the CPU 62 sets an initial value "1.0" as an enlargement rate ER, and sets an initial value "1" as a count pointer TP. The enlargement rate ER is an area enlargement rate for enlarging the text region in a region enlarging process of S650 described later. The count pointer TP is a pointer indicating a count of number that the region enlarging process of S650 described later has been performed. Thus, hereinbelow, terms such as "TP-th region enlarging process" or "(TP-1)-th region enlarging process" may be used to express the counts.

In S640, the CPU 62 adds a predetermined fixed value α (e.g., "0.05") to a current value (e.g., "1.0") of the enlargement rate ER to calculate a new value (e.g., "1.05") for the enlargement rate ER.

In S650, the CPU 62 executes the region enlarging process (see FIG. 8 described later). That is, the CPU 62 enlarges the text region TOA according to the current value (e.g., "1.05") of the enlargement rate ER calculated in S640 to determine each enlarged region.

In S670, the CPU 62 judges whether or not the enlarged region determined in S650 (e.g., enlarged region EA in FIG. 8) satisfies a predetermined condition. In the present embodiment, the predetermined condition is as follows. For example, if the size of the blank space region is relatively small, the enlarged region may possibly not fit within the blank space region BA when the text region is enlarged according to the enlargement rate ER. In this case, the CPU 62 cannot appropriately determine the enlarged region using the formula of FIG. 8 described later, so it judges that the enlarged region does not satisfy the predetermined condition (NO to S670). Further, for example, in a case where a plurality of enlarged regions is determined in S650, two enlarged regions among the plurality of enlarged regions may overlap each other. In this case, the CPU 62 judges that the enlarged regions do not satisfy the predetermined condition (NO to S670). On the other hand, in a case where the enlarged region fits in the blank space region BA, and the two enlarged regions do not overlap each other, the CPU 62 judges that the enlarged regions satisfy the predetermined condition (YES to S670).

In the case of judging that the enlarged regions do not satisfy the predetermined condition (NO to S670), the CPU 62 determines the enlarged regions that were determined in the (TP-1)-th region enlarging process as the target regions TA (see S600 of FIG. 3) in S672. Notably, in a case where the current value of the count pointer TP is "1", in S672, the CPU 62 determines the text region TOA as the target region TA as it is. The process of FIG. 7 ends when S672 ends.

On the other hand, in judging that the enlarged regions satisfy the predetermined condition (YES to S670), the CPU 62 judges whether or not the current value of the enlargement rate ER matches a predetermined value (e.g., "1.4") in S680. This predetermined value means the maximum enlargement rate for determining the target region TA, which in other words means a targeted enlargement rate for enlarging the size of the respective letters in the scan image SI.

In a case of judging that the current value of the enlargement rate ER matches the predetermined value as above (YES to S680), the CPU 62 determines the enlarged region determined in the TP-th region enlarging process as the target region TA (e.g., see target region TA in S600 of FIG. 3) in S682. The process of FIG. 7 ends when S682 ends.

On the other hand, in a case of judging that the current value of the enlargement rate ER does not match the predetermined value as above (NO to S680), the CPU 62 adds "1" to the current value of the count pointer TP and calculates a new value of the count pointer TP in S690. Then, the CPU 62 executes the processes subsequent to S640 again.

(Region Enlarging Process; FIG. 8)

Next, by referring to FIG. 8, contents of the region enlarging process executed in S650 of FIG. 7 will be described. In the region enlarging process, the CPU 62 enlarges the text region TOA according to the enlargement rate ER, and determines the enlarged region.

Respective rectangles in FIG. 8 show the text region TOA, the blank space region BA, and the enlarged region EA. The length of the text region TOA in the horizontal direction (i.e., number of pixels in the horizontal direction), and the length of the text region TOA in the vertical direction (i.e., number of pixels in the vertical direction) are respectively OPx, OPy. The length of the blank space region BA in the horizontal direction (i.e., number of pixels in the horizontal direction), and the length of the blank space region BA in the vertical direction (i.e., number of pixels in the vertical direction) are respectively BPx, BPy. Further, two blank spaces in the horizontal direction (lengths Px1, Px2) and two blank spaces in the vertical direction (lengths Py1, Py2) exist between the text region OA and the blank space region BA.

The CPU 62 uses formulas (1) to (8) of FIG. 7 to calculate four targeted lengths dx1, dx2, dy1, dy2 to determine positon, aspect ratio, and size of the enlarged region EA. The formula (1) indicates that a value obtained by multiplying an area SO of the text region TOA and the current value of the enlargement rate ER matches an area SC of the enlarged region EA. The formula (2) indicates that the area SO of the text region TOA can be obtained by multiplying the length OPx of the text region TOA in the horizontal direction and the length OPy of the text region TOA in the vertical direction. The formula (3) indicates that an area SC of the enlarged region EA is obtained by multiplying a sum of the length OPx of the text region TOA in the horizontal direction and two targeted lengths dx1, dx2, and a sum of the length OPy of the text region TOA in the vertical direction and two targeted lengths dy1, dy2. A formula (4) shows a formula obtained by substituting the area SO of the formula (2) and the area SC of the formula (3) for formula (1). A formula (5) shows that each of four target lengths dx1, dx2, dy1, dy2 can be obtained by multiplying corresponding one of the four blank space lengths Px1, Px2, Py1, Py2 and a coefficient K. A formula (6) shows a formula that is obtained by substituting the respective target lengths dx1, dx2, dy1, dy2 of the formula (5) for the formula (4). A formula (7) shows a formula obtained by expanding the formula (6). A formula (8) shows a formula for calculating the coefficient K by using coefficients a, b, c of the formula (7). If the coefficient K is substituted for the formula (5), the four target lengths dx1, dx2, dy1, dy2 can be calculated.

According to the formulas (1) to (8) in FIG. 8, the following enlarged region EA is obtained. According to the formula (5), a relationship of "dx1+dx2=K×(Px1+Px2)" and a relationship of "dy1+dy2=K×(Py1+Py2)" are obtained. Accordingly, a differential length in the horizontal direction (i.e., dx1+dx2) becomes larger than a differential length in the vertical direction (i.e., dy1+dy2) in a case where a sum of two blank space lengths in the horizontal direction (i.e., Px1+Px2) is larger than a sum of two blank space lengths in the vertical direction (i.e., Py1+Py2), and the differential length in the horizontal direction (i.e., dx1+dx2) becomes smaller than the differential length in the vertical direction (i.e., dy1+dy2) in a case where the sum of two blank space lengths in the horizontal direction (i.e., Px1+Px2) is smaller than the sum of two blank space lengths in the vertical direction (i.e., Py1+Py2). As above, an aspect ratio of the enlarged region EA that differs from the aspect ratio of the text region TOA, a size of the enlarged region EA, and a position of the enlarged region EA are determined based on the two blank space lengths Px1, Px2 in the horizontal direction and the two blank space lengths Py1, Py2 in the vertical direction. Further, the enlarged region EA may be determined as the target region TA (see S672, S682 of FIG. 7).

(Rearranging Process; FIG. 9)

Next, contents of the rearranging process executed in S700 of FIG. 3 will be described with reference to FIG. 9. In S710, the CPU 62 determines one text region TOA as the process target from among the one or more text regions included in the scan image SI. Hereinbelow, the text region determined as the process target in S710 will be termed a "process-subject text region". Further, a target region determined in connection to the process-subject text region will be termed a "process-subject target region", and coupled image data indicating a coupled image (e.g., CI in FIG. 3) in which each of letter strings included in the process-subject text region is coupled will be termed "process-subject coupled image data".

In S720, the CPU 62 sets an initial value OPx (i.e., the length of the process-subject text region in the horizontal direction) as the length W in the horizontal direction (i.e., number of pixels W in the horizontal direction) of a candidate rearranged region being a candidate of a rearranged region to be determined (see RA in FIG. 3), and also sets an initial value OPy (i.e., the length of the process-subject text region in the vertical direction) as the length H in the vertical direction (i.e., number of pixels H in the vertical direction) of the candidate rearranged region.

In S730, the CPU 62 judges whether or not a ratio W/H of the length H in the vertical direction and the length W in the horizontal direction of the candidate rearranged region is smaller than a ratio TW/TH of a lengthTH in the vertical direction TH and a length TW in the horizontal direction of the process-subject target region.

In a case of judging that the ratio W/H is less than the ratio TW/TH (YES to S730), the CPU 62 adds a predetermined fixed value β (e.g. 1 pixel) to the current length W of the candidate rearranged region in the horizontal direction to determine a new length W of the candidate rearranged region in the horizontal direction in S732. The process proceeds to S740 when S732 is finished.

On the other hand, in a case of judging that the ratio W/H is equal to or more than the ratio TW/TH (NO to S730), the CPU 62 subtracts the predetermined fixed value β (e.g. 1 pixel) from the current length W of the candidate rearranged region in the horizontal direction to determine a new length W of the candidate rearranged region in the horizontal direction in S734. When S734 is finished, the process proceeds to S740. Notably, in the present embodiment, the same fixed value β is used in S732 and S734, however, the fixed value in S732 and the fixed value in S734 may be different values in a modification.

In S740, the CPU 62 determines a length m between lines along the vertical direction (i.e., a number of pixels m between the lines) according to a resolution of the scan image data SID. For example, in a case where the resolution of the scan image data SID is 300 dpi, the CPU 62 determines 1 pixel as the length m between the lines, and in a case where the resolution of the scan image data SID is 600 dpi, the CPU 62 determines 2 pixels as the length m between the lines. That is, the CPU 62 determines a larger length m between the lines for higher resolutions of the scan image data SID. According to this configuration, the CPU 62 can determine the length m between the lines having an appropriate size according to the resolution of the scan image data SID. Notably, in a modification, a fixed value may be employed as the length m between the lines irrelevant to the resolution of the scan image data SID.

In S750, the CPU 62 executes a line number determining process based on the process-subject coupled image data and the new length W of the candidate rearranged region in the horizontal direction as determined in S732 or S734 (see FIG. 10 described later). In the line number determining process, the CPU 62 determines a number of lines for a case of rearranging a plurality of letters (e.g., "A to M") included in the process-subject coupled image (e.g., CI in FIG. 3) within the candidate rearranged region.

(Line Number Determining Process; FIG. 10)

Figure 10:
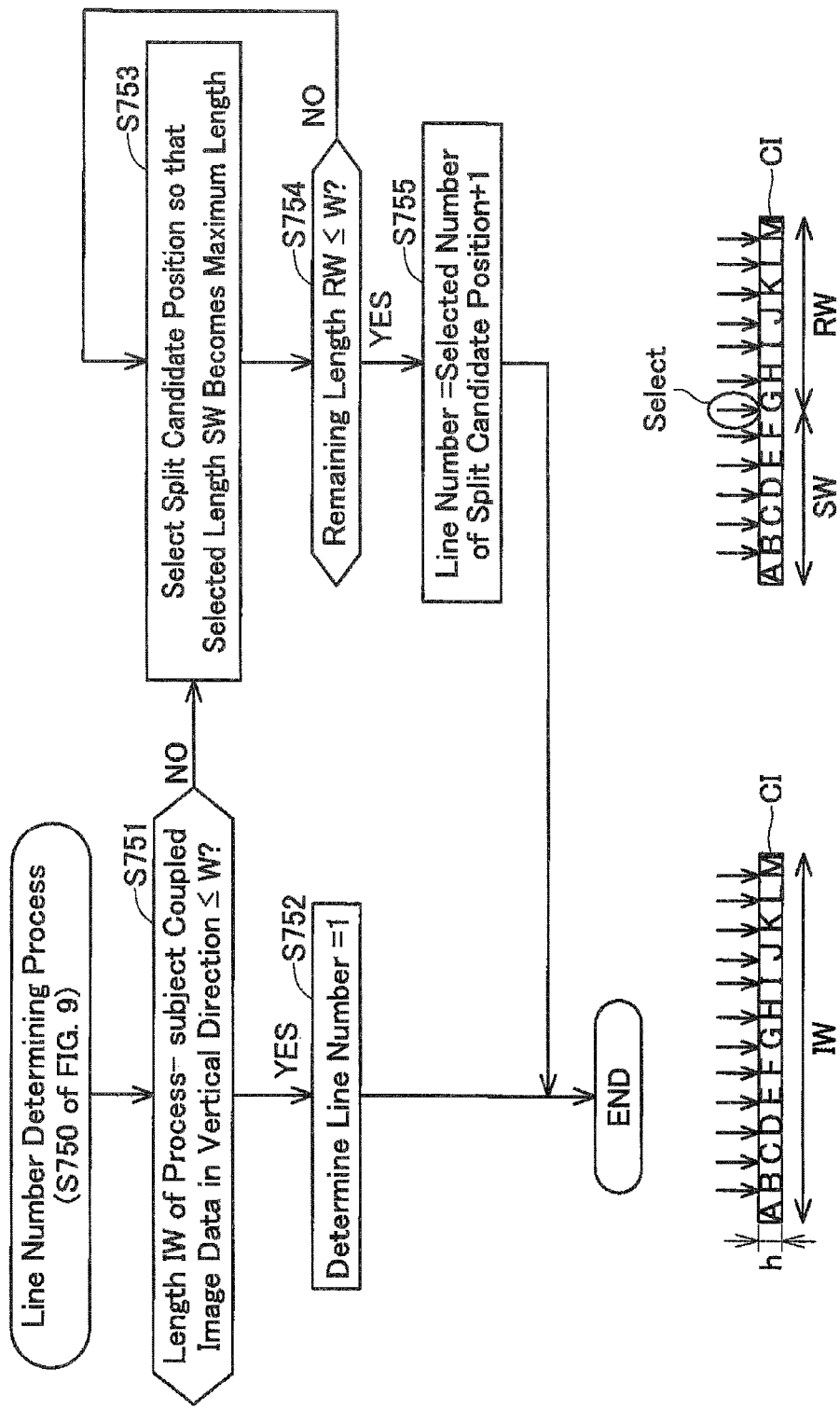
FIG. 10 shows a flowchart of a line number determining process.

As shown in FIG. 10, in S751, the CPU 62 judges whether or not a length IW of the process-subject coupled image in the horizontal direction (e.g., CI in FIG. 11) is equal to or less than the length W of the candidate rearranged region in the horizontal direction. In a case of judging that the length IW is equal to or less than the length W (YES to S751), the CPU 62 determines "1" as the number of lines in S752. This is because all of the letters "A to M" included in the process-subject coupled image CI can be fitted within the candidate rearranged region in a state where all of the letters "A to M" are aligned in a straight line. The process of FIG. 10 ends when S752 finishes.

On the other hand, in judging that the length IW is larger than the length W (NO to S751), the plurality of letters "A to M" included in the process-subject coupled image CI needs to be arranged by being split. Due to this, the CPU 62 executes S753 and 754 to select one or more split candidate positions from among a plurality of split candidate positions determined in S540 of FIG. 6 (e.g., see a plurality of arrows given to the process-subject coupled image CI in FIG. 10).

In S753, the CPU 62 selects one split candidate position from among the plurality of split candidate positions so that the selected length SW becomes a maximum length that is equal to or less than the length W of the candidate rearranged region in the horizontal direction. In a state where the one split candidate position is not yet selected, the selected length SW is a length in the horizontal direction between a fore end of the process-subject coupled image CI and the split candidate position to be selected. Further, in a state where the one or more split candidate position is already selected, the selected length SW is a length in the horizontal direction between the split candidate position that was selected most recently and the split candidate position, existing closer to a rear end than the aforementioned split candidate position, and that is to be newly selected. In the example of FIG. 10, the split candidate position between the letter "F" and the letter "G" is selected.

In S754, the CPU 62 judges whether or not a remaining length RW is equal to or less than the length W of the split candidate position in the horizontal direction. The remaining length RW is a length in the horizontal direction between the most recently selected split candidate position and the rear end of the process-subject coupled image. In a case of judging that the remaining length RW is larger than the length W (NO to S754), the CPU 62 returns to S753, and newly determines a split candidate position existing further on the rear end side than the most recently selected split candidate position from among the plurality of split candidate positions.

On the other hand, in case of judging that the remaining length RW is equal to or less than the length W (YES to S754), the CPU 62 determines a number obtained by adding "1" to the number of selected split candidate position as the number of lines. The process of FIG. 10 ends when S755 finishes.

(Continuation of Rearranging Process; FIG. 9)

Figure 9:
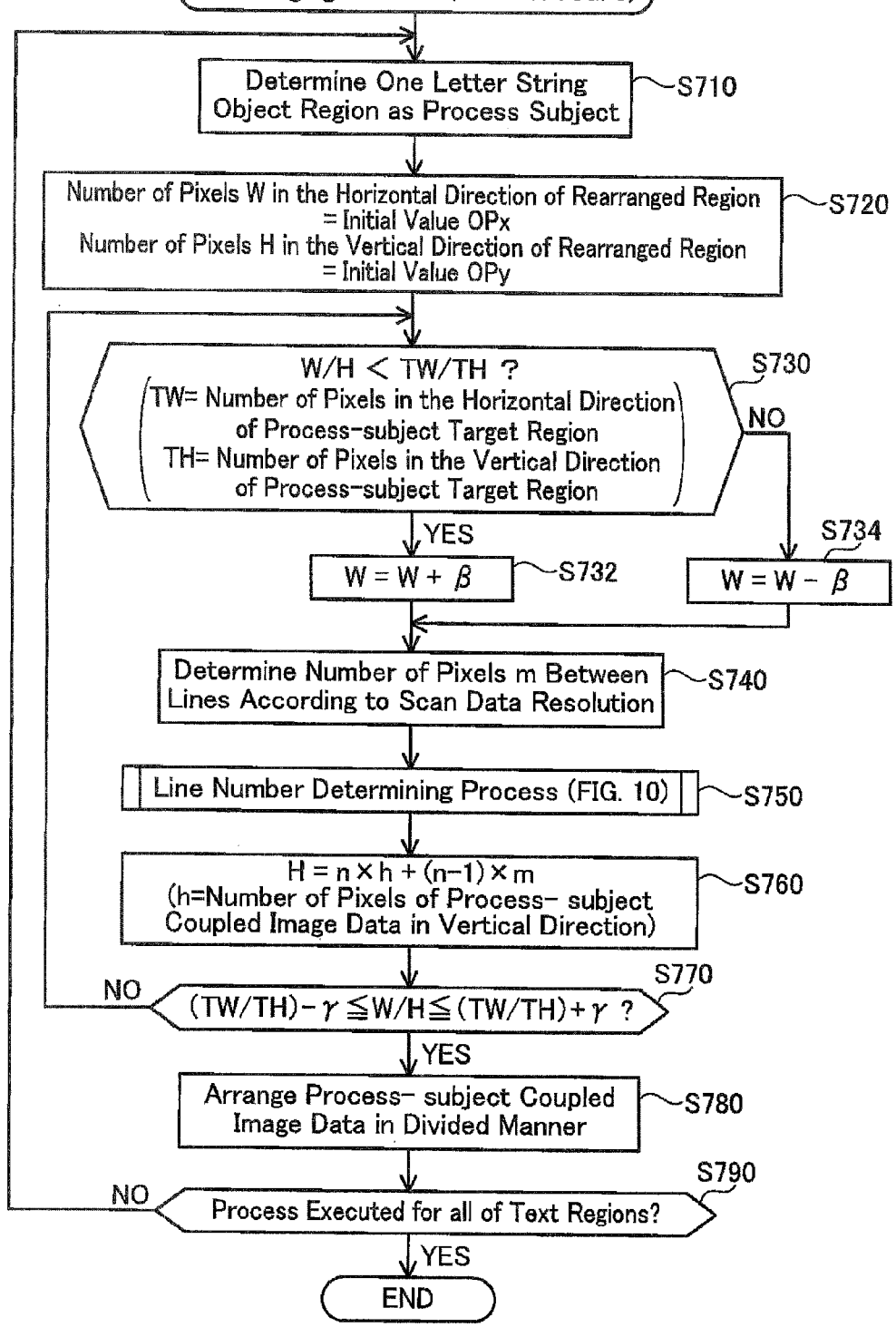
FIG. 9 shows a flowchart of a rearranging process.

In S760 of FIG. 9, the CPU 62 determines the new length H of the candidate rearranged region in the vertical direction according to the formula in S760. In the formula of S760, "m" denotes the length between the lines as determined in S740, "n" denotes the number of the lines determined in S750, and "h" denotes the length of the process-subject coupled image data in the vertical direction (see h in the coupled image CI of FIG. 10).

In S770, the CPU 62 judges whether or not the aspect ratio W/H of the candidate rearranged region approximates the aspect ratio TW/TH of the process-subject target region. Specifically, the CPU 62 judges whether or not the aspect ratio W/H of the candidate rearranged region is included in a predetermined range set based on the aspect ratio TW/TH of the process-subject target region. The predetermined range is a range between a value obtained by subtracting a value γ from the aspect ratio TW/TH of the process-subject target region and a value obtained by adding the value γ to the aspect ratio TW/TH of the process-subject target region. Notably, the value γ may be a predetermined fixed value, or may be a value obtained by multiplying a predetermined coefficient (e.g., 0.05) to TW/TH.

In a case of judging that the aspect ratio W/H of the candidate rearranged region does not approximate the aspect ratio TW/TH of the process-subject target region (NO to S770), the CPU 62 executes respective processing of S730 to S760 again. Due to this, the CPU 62 determines the new length W in the horizontal direction and the new length H in the vertical direction of the candidate rearranged region, and executes the judgment of S770 again.

On the other hand, in a case of judging that the aspect ratio W/H of the candidate rearranged region approximates the aspect ratio TW/TH of the process-subject target region (YES to S770), the CPU 62 firstly determines the candidate rearranged region having the length W in the horizontal direction and the length H in the vertical direction as the rearranged region (e.g., RA in FIG. 3) in S780. Then, in a case where the one or more split candidate positions have been selected in S753 of FIG. 10, the CPU 62 splits the process-subject coupled image data at the one or more split candidate positions, and generates two or more split image data indicating two or more split images. Next, the CPU 62 arranges the two or more split image data in the rearranged region so that the two or more split images align along the vertical direction. At this occasion, the CPU 62 arranges the two split image data so that the space between the lines as determined in S740 is formed between the two split images being adjacent along the vertical direction. As a result, as shown in S700 of FIG. 3, for example, rearranged image data indicating the rearranged image RI in which the plurality of letters "A" to "M" is rearranged in the rearranged region RA is generated. The size of the plurality of letters "A" to "M" in the rearranged image RI is equal to the size of the plurality of letters "A" to "M" in the scan image SI.

In S790, the CPU 62 judges whether or not the processes from S710 to S780 have been completed for all of the text regions included in the scan image SI. In a case of judging that the processes have not been completed (NO to S790), the CPU 62 determines an unprocessed text region as the process subject in S710, and executes the processes of S712 and subsequent steps again. Then, in a case of judging that the processes have been completed (YES to S790), the CPU62 ends the process of FIG. 9.

(Case A; FIG. 11)

Next, a specific case A will be described in connection to the rearranging process pf S700 of FIG. 3 (see FIG. 9) and the enlarging process of S800 by referring to FIG. 11. As shown in (A1), the length OPx in the horizontal direction OPx and the length OPy in the vertical direction of the process-subject text region TOA are set respectively as the initial value of the length W in the horizontal direction and the initial value of the length H in the vertical direction of the candidate rearranged region (S720 of FIG. 9). In the present case, W/H is less than TW/TH. That is, when compared to the process-subject text region TOA, the process-subject target region TA has a shape that is horizontally long. In this case, if the candidate rearranged region is reshaped to a horizontally long shape, the aspect ratio of the candidate rearranged region approaches the aspect ratio of the process-subject target region TA. Accordingly, as shown in (A2), the fixed value β is added to the current length W of the candidate rearranged region in the horizontal direction, and the new length W of the candidate rearranged region in the horizontal direction is determined (S732). In this case, as the number of lines, three lines including the letter string "A to E", the letter string "F to J", and the letter string "K to M" are determined (S750). Then, the new length H of the candidate rearranged region in the vertical direction is determined (S760).

In the state of (A2), since the aspect ratio W/H of the candidate rearranged region does not approximate the aspect ratio TW/TH of the process-subject target region TA (NO to S770), the fixed value β is again added to the current length W of the candidate rearranged region in the horizontal direction, and the new length W of the candidate rearranged region in the horizontal direction is determined again (S732). In this case, as the number of lines, three lines including the letter string "A to F", the letter string "G to L", and the letter string "M" are determined (S750). That is, the maximum number of letters that can configure one line of letter string within the candidate arranged region is increased due to the increase in the length W of the candidate rearranged region in the horizontal direction. Then, the new length H of the candidate rearranged region in the vertical direction is determined (S760). Thereafter, the processes of S 730 to S770 are repeatedly executed until the aspect ratio W/H of the candidate rearranged region is judged as approximating the aspect ratio TW/TH of the process-subject target region TA.

As shown in (A3), the aspect ratio W/H of the candidate rearranged region approximates the aspect ratio TW/TH of the process-subject target region TA (YES to S770). Notably, in this case, two lines, including the letter string "A to G" and the letter string "H to M", are determined as the number of lines (S750). Accordingly, as shown in (A4), the candidate rearranged region of (A3) is determined as the rearranged region RA (S780). In this case, the aspect ratio W/H of the rearranged region RA is normally closer to the aspect ratio TW/TH of the process-subject target region TA than the aspect ratio of the process-subject text region TOA. Next, the process-subject coupled image data indicating the process-subject coupled image CI is split, and two split image data indicating two split images DI1, DI2 are generated (S780). Then, two split image data are arranged in the rearranged region RI so that the two split images DI1, DI2 are arranged along the vertical direction, and a space having a length m is formed between the adjacent two split images. As a result, the rearranged image data indicating the rearranged image RI is generated (S780).

Figure 3:
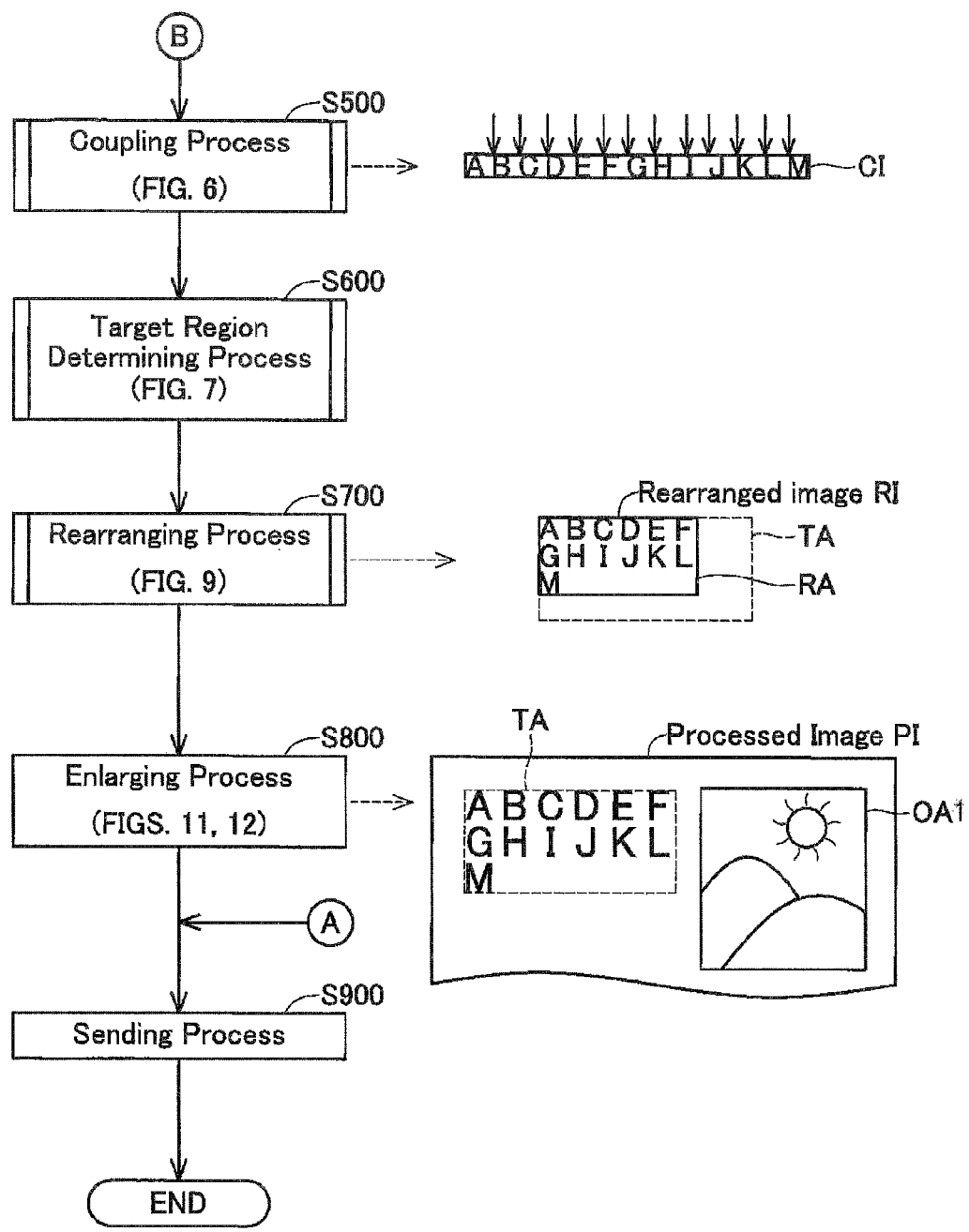
FIG. 3 shows a flowchart of the process continued from FIG. 2 by the image processing server.

Next, the rearranged image data is enlarged to generate enlarged image data indicating an enlarged image (S800 of FIG. 3). Specifically, the rearranged image RI is enlarged in a direction along which a diagonal line of the rearranged image RI extends, as a result of which the enlarged image data indicating the enlarged image is generated. For example, in a case where the aspect ratio W/H of the rearranged region RA is equal to the aspect ratio TW/TH of the process-subject target region TA, all of four sides of the enlarged image match the four sides of the subject target region TA. That is, in this case, the size of the enlarged image matches the size of the target region TA. However, for example, in a case where the aspect ratio W/H of the rearranged region RA is not equal to the aspect ratio TW/TH of the process-subject target region TA, the enlargement of the rearranged image RI ends at a state where one of the sides of the enlarged images matched one of the sides of the process-subject target region TA in the course of gradually enlarging the rearranged image RI. That is, in this case, the size of the enlarged image becomes smaller than the size of the target region TA.

Next, as shown in (A5), the enlarged image data in which the rearranged image data indicating the rearranged image RI is enlarged is overwritten in the target region TA of the scan image data SID (S800 of FIG. 3). As a result, the processed image data PID indicating the processed image PI is completed. In the processed image PI, a layout of the plurality of letters "A to M" included in the text region TOA is different from a layout of the plurality of letters "A to M" after the enlargement as included in the target region TA. Notably, "the layouts being different" herein means that there is a difference at least in a number of letters, or in a magnification of letters, spaces between the letters, or spaces between the lines, in comparing the plurality of letters configuring the M lines of letter strings included in the text region TOA and the plurality of letters configuring the M lines of letter strings after the enlargement as included in the target region TA. More specifically, "the layouts being different" herein can also be said as that an enlargement of a partial image within the circumscribing rectangle (i.e., text region TOA) in the text object TOB of the scan image SI does not match a partial image in the target region TA including the text object within the enlarged image in the processed image data.

As mentioned above, in the present embodiment, relatively small length m (e.g., 1 pixel, 2 pixels, etc.) between the lines is determined in S740 of FIG. 9, and this length m between the lines is employed in the rearranged image RI. Accordingly, the length m between the lines in the rearranged image RI is normally smaller than the length between the lines in the scan image SI. As a result, the ratio of the length of the spaces between the lines with respect to the length of the plurality of letters in the processed image PI obtained by enlarging the rearranged image RI in the vertical direction (e.g., the length of the letter "A" in the vertical direction) becomes smaller than the ratio of the length of the spaces between the lines with respect to the length of the plurality of letters in the scan image SI in the vertical direction. As above, the present embodiment can make the length of the spaces between the lines in the processed image PI relatively small, based on which compactization the letters can appropriately be enlarged in the processed image PI.

(Case B; FIG. 12)

Next, a case B will be described by referring to FIG. 12. As shown in (B1), in the present case, the ratio W/H is larger than the ratio TW/TH. That is, the process-subject target region TA has a vertically long shape compared to the ratio of the process-subject text region TOA. In this case, the aspect ratio of the candidate rearranged region comes closer to the aspect ratio of the process-subject target region TA by making the candidate rearranged region to be in a vertically long shape. Accordingly, as shown in (B2), the fixed value P3 is subtracted from the current length W of the candidate rearranged region in the horizontal direction, and the new length W of the candidate rearranged region in the horizontal direction is determined (S734). In this case, as the number of lines, four lines including the letter string "A to D", the letter string "E to H", the letter string "I to L", and the letter string "M" are determined (S750). That is, in this case, the maximum number of letters that can configure one line of letter string in the candidate rearranged region is decreased owing to the length W of the candidate rearranged region in the horizontal direction becoming small. Further, the new length H of the candidate rearranged region in the vertical direction is determined (S760).

In the state of (B2), the aspect ratio W/H of the candidate rearranged region approximates the aspect ratio TW/TH of the process-subject target region TA (YES to S770). Accordingly, as shown in (B3), the candidate rearranged region of (B2) is determined as the rearranged region RA (S780).

Next, the process-subject coupled image data indicating the process-subject coupled image CI is split, and four split image data indicating four split images DI4 to DI7 are generated (S780). Then, similar to the case A of FIG. 11, the rearranged image data indicating the rearranged image RI is generated (S780), and as shown in (B4), the enlarged image data in which the rearranged image data is enlarged is created, and the enlarged image data is overwritten in the target region TA of the scan image data SID (S800 of FIG. 3). As a result, the processed image data PID indicating the processed image PI is completed. In the processed image PI, the layout of the plurality of letters "A to M" included in the text region TOA is different from the layout of the plurality of letters "A to M" after the enlargement as included in the target region TA:

Effects of the First Embodiment

According to the present embodiment, the image processing server 50 can execute different types of enlarging processes according to a judging result on whether to execute a first type of enlarging process, or a second type of enlarging process. The different types of enlarging processes includes a simple enlargement process S400 of FIG. 2) that does not change the layout of the plurality of letters included in the text object, and an enlarging process (S500 and S800 of FIG. 3) by which the layout may be changed. Due to this, in a case of judging that the simple enlargement process should be executed, the layout of the plurality of letters included in the text object TOB does not have to be changed upon generating the processed image data.

Further, according to the present embodiment, before executing the possesses of S500 to S800 shown in FIG. 3, the judgment on whether or not the simple enlargement condition is satisfied is made. As a result, in the case where the simple enlargement condition is satisfied, the image processing server 50 can generate the enlarged image data without executing the possesses of S500 to S800 shown in FIG. 3. Processing load on the image processing server 50 can be reduced.

Further, in the case where the letter string included in the text object TOB is configured only of one line, then in most cases the creator of the document intentionally describes so using only one line. For example, in a case where the scan image SI is an image indicating a slide for a presentation, the title of the slide may be described in one line. In this case, if the layout of the letter string described by the one line is changed to a plurality of letter strings, such a change might be against the intention of the creator of the document. The present embodiment executes the simple enlargement process without changing the layout of the letter string included in the text object TOB, if the letter string included in the text object TOB is configured only of one line. As a result, the layout can be prevented from being changed against the intention of the creator.

(Corresponding Relationship)

The image processing server 50 is an example of an "image processing device". The scan image SI is each example of an "original image". The blank space region BA is an example of a "space region". The horizontal direction and the vertical direction are respectively an example of a "first direction" and a "second direction". The two blank space lengths Px1, Px2 in the horizontal direction and the two blank space lengths Py1, Py2 in the vertical direction are respectively an example of "two blank space lengths along the first direction", and "two blank space lengths along the second direction".

The simple enlargement process in S400 of FIG. 2 is an example of a "first type of enlarging process", and the processes from S500 to S800 of FIG. 3 are an example of a "second type of enlarging process".

The mechanism that judges whether or not the letter string included in the text region TOA is one line in S300 of FIG. 2 is an example of a configuration for "judging whether to execute a first type of enlarging process or execute a second type of enlarging process based on M lines of letter strings", and is also an example of a configuration for "judging whether M is 1, or M is two or more". Further, the configuration that judges whether or not the letter string included in the text region TOA is one line in S300 of FIG. 2 can be said as being "judging whether to execute a first type of enlarging process or execute a second type of enlarging process based on a characteristic of M lines of letter strings (or a characteristic of the text object) (which is in the present embodiment, the number of lines of the letter string in the text object TOB)".

Hereinbelow, points different from the first embodiment will be described in connection to second to sixth embodiments. In the second to sixth embodiments, the contents of the processes of S300 of FIG. 2 differ from that of the first embodiment.

Figure 13:
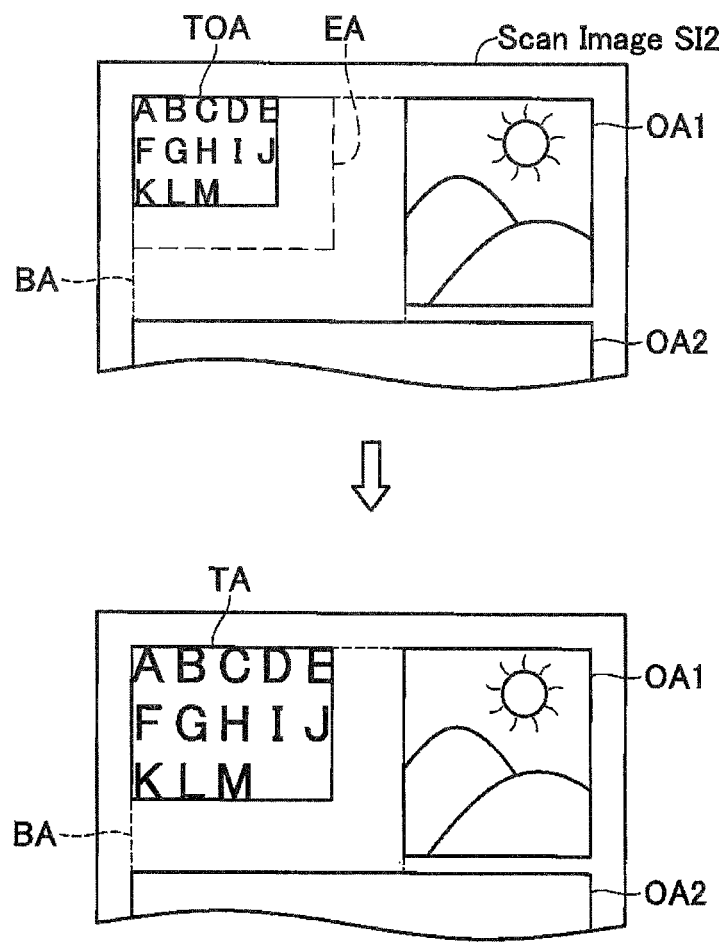
FIG. 13 shows an explanatory diagram for explaining a case satisfying a simple enlargement condition of a second embodiment.

Second Embodiment; FIG. 13

As shown in FIG. 13, the CPU 62 of the image processing server 50 judges whether or not the simply enlarged region, in which the text region TOA of the scan image data SI2 is enlarged by the target magnification (e.g., 1.4) in S300 fits in the blank space region BA determined in S200 of FIG. 2. Specifically, the CPU 62 multiplies a square root (e.g., √1.4) of the target magnification to each of the length in the vertical direction and the length in the horizontal direction of the text region TOA, and determines them as the length in the vertical direction and the length in the horizontal direction of the simply enlarged region. The CPU 62 judges that the simply enlarged region fits within the blank space region BA in a case where the length of the simply enlarged region in the vertical direction is equal to or less than the length of the blank space region BA in the vertical direction, and the length of the simply enlarged region in the horizontal direction is equal to or less than the length of the blank space region BA in the horizontal direction. On the other hand, the CPU 62 judges that the simply enlarged region does not fit within the blank space region BA in at least one of the following cases: a case where the length of the simply enlarged region in the vertical direction is larger than the length of the blank space region BA in the vertical direction, and a case where the length of the simply enlarged region in the horizontal direction is larger than the length of the blank space region BA in the horizontal direction.

The CPU 62 determines the simply enlarged region as the target region TA in the case of judging that the simply enlarged region fits within the blank space region BA (YES to S300) and proceeds to S 400, and on the other hand, proceeds to S500 of FIG. 3 in the case of judging that the simply enlarged region does not fit within the blank space region BA (NO to S300).

In S400, similar to S400 of the first embodiment, the CPU 62 executes the simple enlargement process. Notably, in this embodiment, in S300, it has been judged that the area of the text region TOA can be enlarged by the target magnification without changing the aspect ratio of the text region TOA. Due to this, in S400, the CPU 62 enlarges the text region TOA up to the target region TA as determined to generate the enlarged image data indicating the enlarged image.

According to the present embodiment, the judgment on whether the text region TOA can be enlarged by the target magnification is made before executing the processes of S500 to S800 shown in FIG. 3. As a result, in the case where such enlargement is possible, the image processing server 50 can generate the enlarged image data without executing the processes of S500 to S800 shown in FIG. 3. The processing load on the image processing server 50 can be reduced.

Further, according to the present embodiment, the simple enlargement process is executed without changing the layout of the letter strings included in the text region TOA. As a result, any change in the layout that would be against the intention of the creator can be avoided.

(Corresponding Relationship)

The square root of the target magnification is an example of a "target value", the length in the horizontal direction and the length in the vertical direction of the target region TA are respectively an example of a "first length" and a "second length". The length in the horizontal direction and the length in the vertical direction of the blank space region BA are respectively an example of a "length along the first direction of the space region" and a "length along the second direction of the space region". The length of the target region TA in the vertical direction being smaller than the length of the blank space region BA in the vertical direction and the length of the target region TA in the horizontal direction being smaller than the length of the blank space region BA in the horizontal direction is an example of a "predetermined condition".

Figure 14:
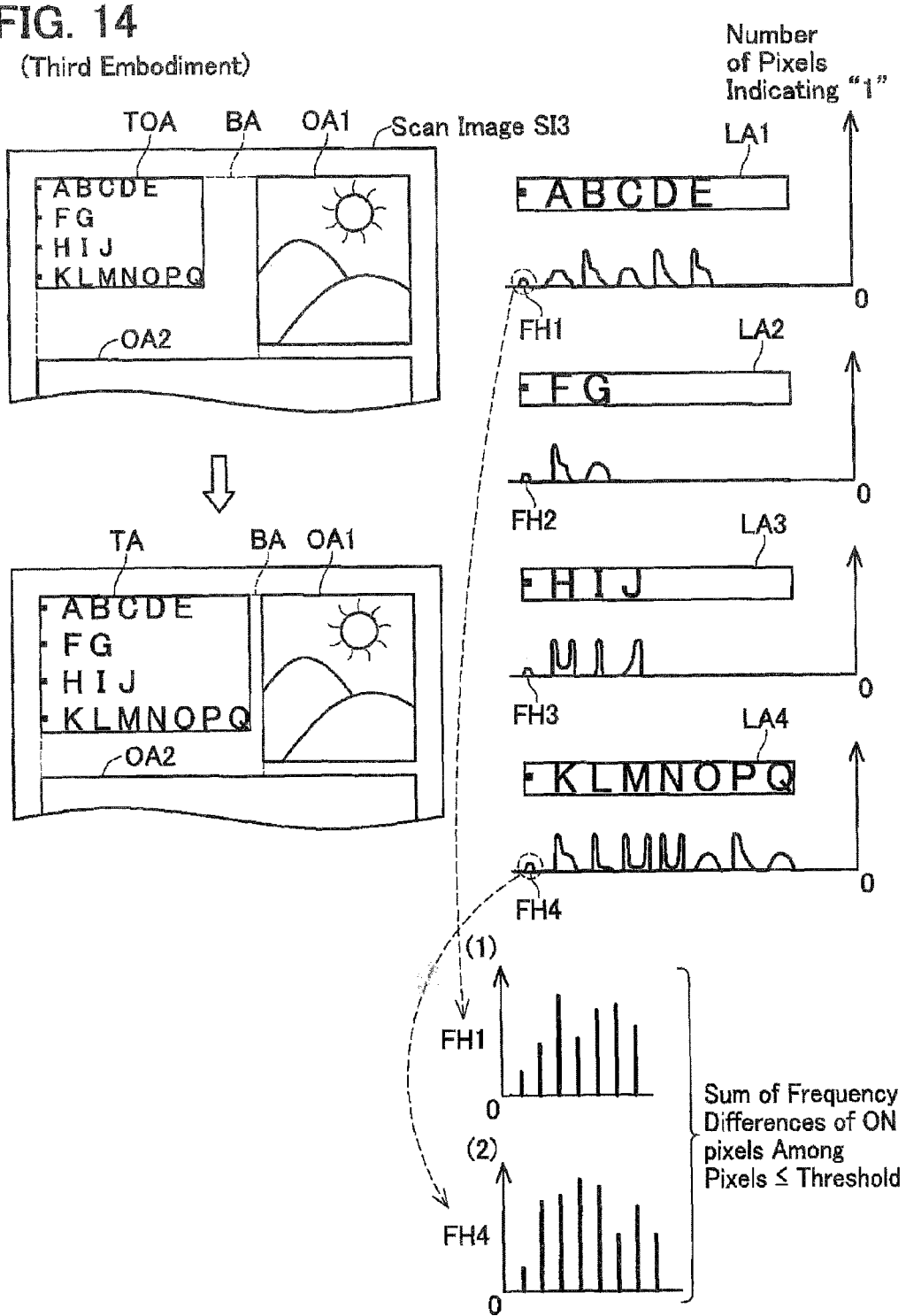
FIG. 14 shows an explanatory diagram for explaining a case satisfying a simple enlargement condition of a third embodiment.

Third Embodiment; FIG. 14

As shown in FIG. 14, the CPU 62 of the image processing server 50 judges in S300 whether or not the text object TOB included in the text region TOA is expressed in itemized form.

Specifically, the CPU 62 firstly generates a projected histogram corresponding to the text region TOA included in the scan image SI3. Notably, the projected histogram indicates a distribution of frequency of ON pixels in a case where the respective pixels indicating the band-shaped regions LA1 to LA4 are projected in the vertical direction, for each of the plurality of band-shaped regions LA1 to LA4 included in the text region TOA (see S160), among the plurality of pixels configuring the binary data BD generated from the scan image SI3 (see S110). In other words, the projected histogram indicates the distribution of frequency of pixels for letters in the case of projecting the respective pixels indicating the text region TOA in the vertical direction. In the projected histogram, each of the one or more letters included in each line of letter strings is indicated in a high frequency range, and a space between two letters is indicated in a range of which frequency is zero. Further, a range from a rear end of the last letter in each line of letter strings to a rear end of the band-shaped region of the corresponding line is indicated in a range of which frequency is zero.

Specifically, the projected histogram of the present embodiment indicates the frequency of the ON pixels in the case of projecting the respective pixels aligned in the horizontal direction in the band-shaped regions LA1 to LA4 in the vertical direction (see (1) and (2) of FIG. 14). The CPU 62 extracts fore end high frequency ranges FH1 to FH4, which are high frequency ranges positioned at the fore end from the histograms generated for each of the band-shaped regions LA1 to LA4. Then, as shown in (1) and (2) of FIG. 14, in connection to the frequency of the ON pixels at each position in the fore end high frequency range FH1 and the frequency of the ON pixels at corresponding positions in the fore end high frequency range FH4, the CPU 62 calculates a difference in the frequency of the ON pixels for each of those positions, and determines a sum D of those differences.

The CPU 62 determines the sum D similarly for each of a pair of the fore end high frequency of range FH1 and the fore end high frequency range FH2, a pair of the fore end high frequency range FH1 and the fore end high frequency range FH3. Then, in a case where the three sums as determined are all equal to or less than a predetermined threshold (e.g., "5"), the CPU 62 judges that the text object TOB is expressed in the itemized form (YES to S300), and executes the simple enlargement process. On the other hand, in a case where the three sums as determined are all larger than the predetermined threshold, the CPU 62 judges that the text object TOB is not expressed in the itemized form (NO to S300), and executes processes of S500 and thereafter. In the simple enlargement process, the CPU 62 generates the enlarged image data by executing processes similar to those of the first embodiment.

According to the present embodiment, the judgment as to whether the text object TOB is expressed in itemized form or not is made before executing the processes of S500 to S800 shown in FIG. 3. As a result, upon determining that the enlargement is possible, the image processing server 50 can generate the enlarged image data without executing the processes of S500 to S800 shown in FIG. 3. The processing load on the image processing server 50 can be reduced.

In the case where the text object TOB is expressed in the itemized form, any change in the layout of the plurality of letters included in the text object TOB may cause the itemized contents unclear. In the present embodiment, in the case of judging that the text object TOB is expressed in the itemized form, the simple enlargement process is executed without changing the layout of the plurality of letters included in the text object TOB. As a result, changes in the layout of the plurality of letters expressed in the itemized form can be avoided.

In the present embodiment, the configuration that judges whether to execute the simple enlargement process or to execute the processes of S500 and thereafter based on the fore end high frequency ranges FH1 to FH4 is an example of "judging whether to execute a first type of enlarging process or execute a second type of enlarging process based on M lines of letter strings". Further, this configuration can be said as "judging whether to execute the first type of enlarging process or to execute the second type of enlarging process based on a characteristic of M lines of letter strings (or a characteristic of text object) (i.e., the projected histogram of the text object)".

Figure 15:
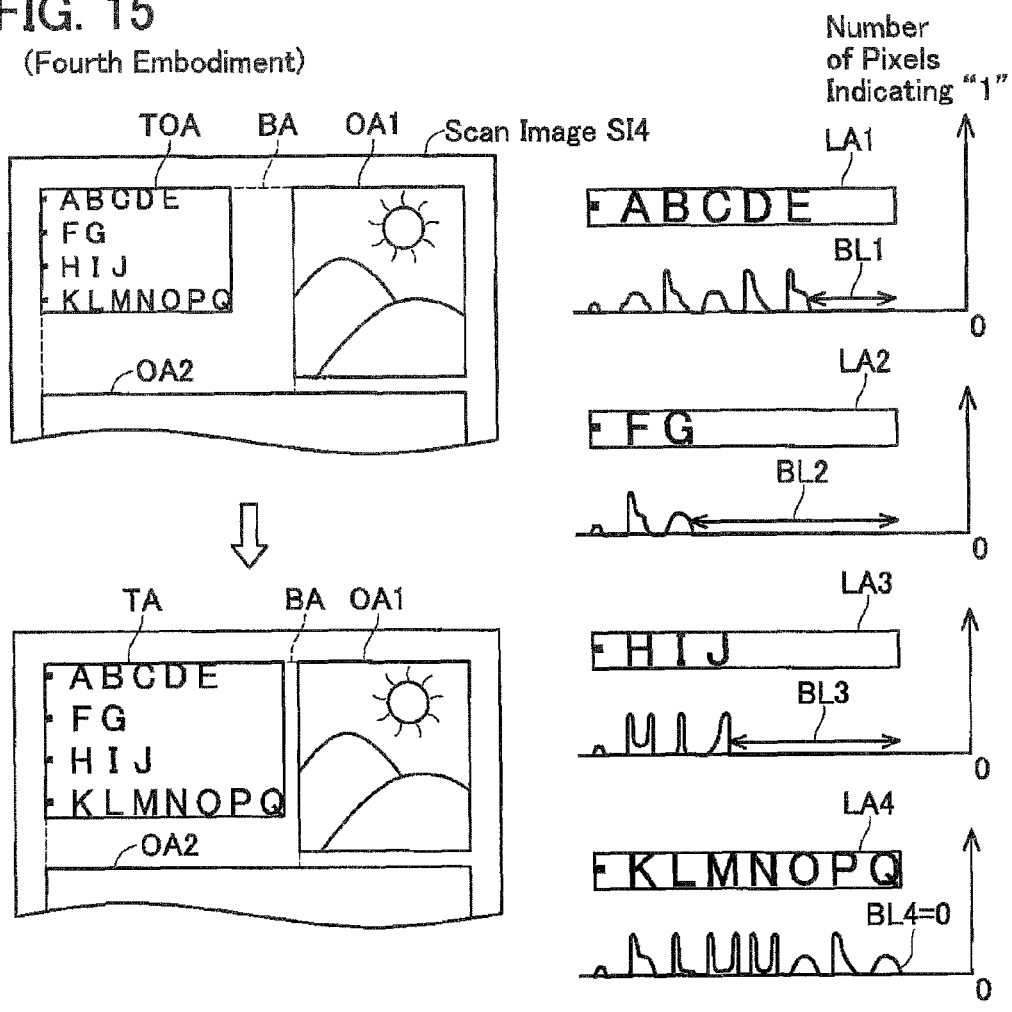
FIG. 15 shows an explanatory diagram for explaining a case satisfying a simple enlargement condition of a fourth embodiment.

Fourth Embodiment; FIG. 15

As shown in FIG. 15, the CPU 62 of the image processing server 50 judges in S300 whether or not a variation among blank spaces of the respective lines included in the text region TOA is large.

Specifically, similar to the third embodiment, the CPU 62 firstly generates the projected histograms for the band-shaped regions LA1 to LA4. Then, the CPU 62 specifies a distance BL1 from the rear end of the high frequency range positioned backmost to a right end of the band-shaped region LA1 in the projected histogram of the band-shaped region LA1. Due to this, a blank space length of the first line of the letter string is specified. Notably, the distance BL1 is specified by the number of pixels.

Next, the CPU 62 specifies distances BL2 to BL4 for each of the other band-shaped regions LA2 to LA4 in a similar manner. Then, the CPU 62 judges that the variation in the blank spaces at the rear ends of the respective lines of letter strings included in the text region TOA is large (YES to S300) in a case where a sum of absolute values of respective differences between the average values of the distances BL2 to BL4 and the distances BL2 to BL4 is equal to or larger than a threshold (e.g., 100), and executes the simple enlargement process. On the other hand, the CPU 62 judges that the variation in the blank spaces at the rear ends of the respective lines of letter strings included in the text region TOA is small (NO to S300) in a case where the sum of the absolute values of respective differences between the average values of the distances BL2 to BL4 and the distances BL2 to BL4 is less than the threshold, and executes the processes of S500 and thereafter. In the simple enlargement process, the CPU 62 generates the enlarged image data by executing the processes similar to the first embodiment.

Figure 19:
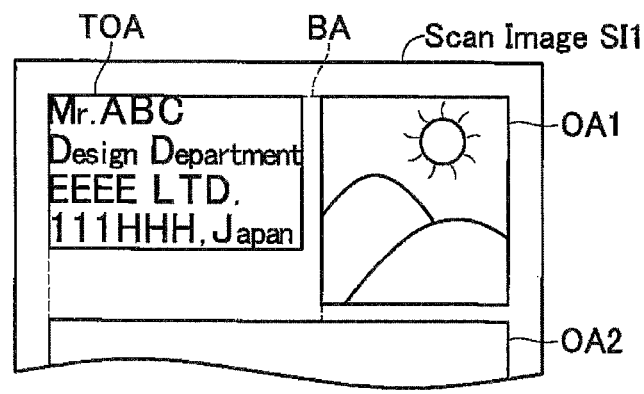
FIG. 19 shows an explanatory diagram for explaining a case satisfying the simple enlargement condition of the fourth embodiment.

In the case where the variation in the blank spaces at the rear ends of the respective lines is large, then in most cases the creator of the document intentionally breaking the lines. For example, as shown in FIG. 15, in the case of the itemized form, the blank space lengths in the respective lines vary depending on the length of the item described in each line. Further, for example, as shown in FIG. 19, an address of a letter is being described in the text region TOA. In such a case, if the layout of the plurality of letters included in the text object TOB is changed, such a change in the layout might be against the intention of the creator of the document. The present embodiment executes the simple enlargement process without changing the layout of the letter string included in the text object TOB, if the variation in the blank spaces at the rear ends of the respective lines is large. As a result, the layout can be prevented from being changed against the intention of the creator.

(Corresponding Relationship)

Of the projected histograms of the respective band-shaped regions LA1 to LA4, the rear ends of the high frequency range positioned backmost side are an example of "a one end of a line of letter string", and the right ends of the respective band-shaped regions LA1 to LA4 are an example of "a boundary of text regions". The distances BL1 to BL4 are an example of "blank space lengths". The sum of the absolute values of the differences between the average values of the distances BL1 to BL4 and the distances BL1 to BL4 is an example of a variation of M blank space lengths calculated for the M lines of letter strings, and the threshold is an example of "a predetermined variation".

In the present embodiment, the configuration that judges whether to execute the simple enlargement process or to execute the processes of S500 and thereafter based on the distances BL1 to BL4 is an example of "judging whether to execute a first type of enlarging process or execute a second type of enlarging process based on M lines of letter strings". Further, this configuration can be said as "judging whether to execute the first type of enlarging process or to execute the second type of enlarging process based on a characteristic of M lines of letter strings (or a characteristic of text object) (i.e., the blank space lengths)".

As an alternative to the use of the variation of the blank space lengths at the rear ends of the respective lines of letter strings included in the text region TOA of the present embodiment, the judgment on whether to execute the simple enlargement process or to execute the processes of S500 and thereafter can be judged by using the variation in blank spaces at fore ends of the respective lines of letter strings. In this case, the CPU 62 may specify a distance from the fore end of the high frequency range positioned on the foremost side to a left end of the band-shaped region (i.e., blank space length), for each of the band-shaped regions LA1 to LA4, from among the projected histograms of the band-shaped regions. According to this configuration, an undesired change in the layout against the creator's intention can be avoided, for example, in a case where the respective lines of letter strings are centered (e.g., as in a course menu in a restaurant). The blank space lengths of the fore ends in the layout of the plurality of letters included in the text object TOB is an example of "a blank space length along the first direction between one end of the one line of letter string and the boundary of the text regions".

Figure 16:
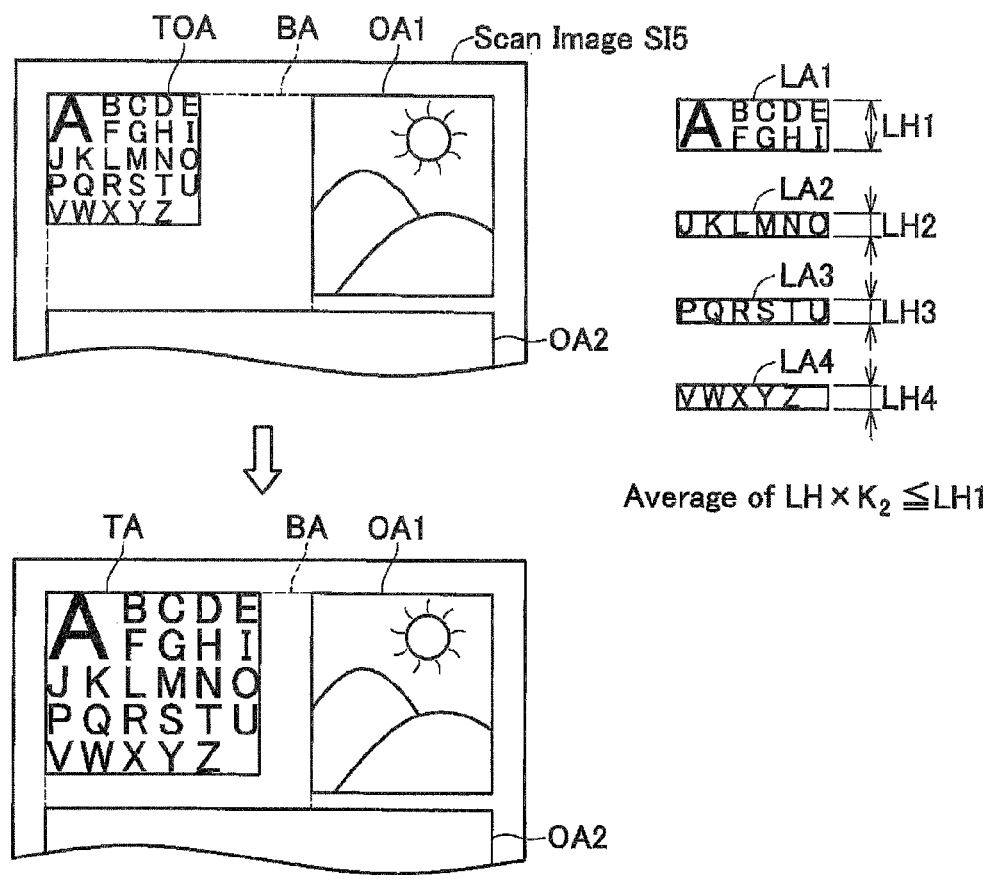
FIG. 16 shows an explanatory diagram for explaining a case satisfying a simple enlargement condition of a fifth embodiment.

Fifth Embodiment; FIG. 16

As shown in FIG. 16, the CPU 62 of the image processing server 50 judges in S300 whether or not a line that is extremely large in regards to its line width (i.e., the length in the vertical direction) as compared to the widths of other lines exists among the lines of letter strings included in the text region TOA.

Specifically, the CPU 62 firstly specifies widths LH1 to LH4 of the band-shaped regions LA1 to LA4, for each of the plurality of band-shaped regions LA1 to LA4 included in the text region TOA (see S160). Notably, the widths LH1 to LH4 are indicated by the numbers of pixels. As shown in FIG. 16, the first letter "A" is described using two lines configured of other letters, namely the line of "B to E" and the line of "F to I". In this case, in S160, one band-shaped region LA1 including the letter "A", the line of "B to E" and the line of "F to I" is determined.

Next, the CPU 62 judges that the line with the extremely large line width exists (YES to S300) in a case where there is a width that is equal to or larger than K times the average of the widths LH1 to LH4 (e.g., K=1.5) among the widths LH1 to LH4, and executes the simple enlargement process. On the other hand, in a case where there is no width that is equal to or larger than K times the average of the widths LH1 to LH4 among the widths LH1 to LH4 (NO to S300), the CPU 62 judges that the line with the extremely large line width is does not exist, and executes the processes of S500 and thereafter. In the simple enlargement process, the CPU 62 generates the enlarged image data by executing processes similar to the first embodiment.

According to this configuration, the judgment as to whether or not a specific letter (e.g., the "A" as aforementioned) that is extremely large compared to other letters is included in the plurality of letters included in the text region TOA can be made. For example, in articles in a newspaper or magazine, in some cases the first letter of a sentence is indicated larger than other letters. In such a case, for example, when the processes of S500 and thereafter are executed and the enlarging process is executed, the band-shaped region LA1 and the band-shaped region LA2 may in some cases be coupled. In such a case, the letter strings that are shown in two lines are suddenly expressed by one line after the letter "J", which makes it difficult to read. In the present embodiment, the aforementioned circumstance can be avoided. Further, according to the present embodiment, the simple enlargement process is executed without changing the layout of the letter strings included in the text region TOA. As a result, the layout can be avoided from being changed against the intention of the creator.

In the present embodiment, the configuration that judges whether to execute the simple enlargement process or to execute the processes of S500 and thereafter based on whether or not a line with extremely large width compared to other lines included therewith is an example of "judging whether to execute a first type of enlarging process or execute a second type of enlarging process based on M lines of letter strings". Further, this configuration can be said as being "judging whether to execute a first type of enlarging process or execute a second type of enlarging process based on the characteristic of M lines of letter strings (or characteristic of the text object) (i.e., the width of the lines of letter strings included in the text object TOB)".

Figure 17:
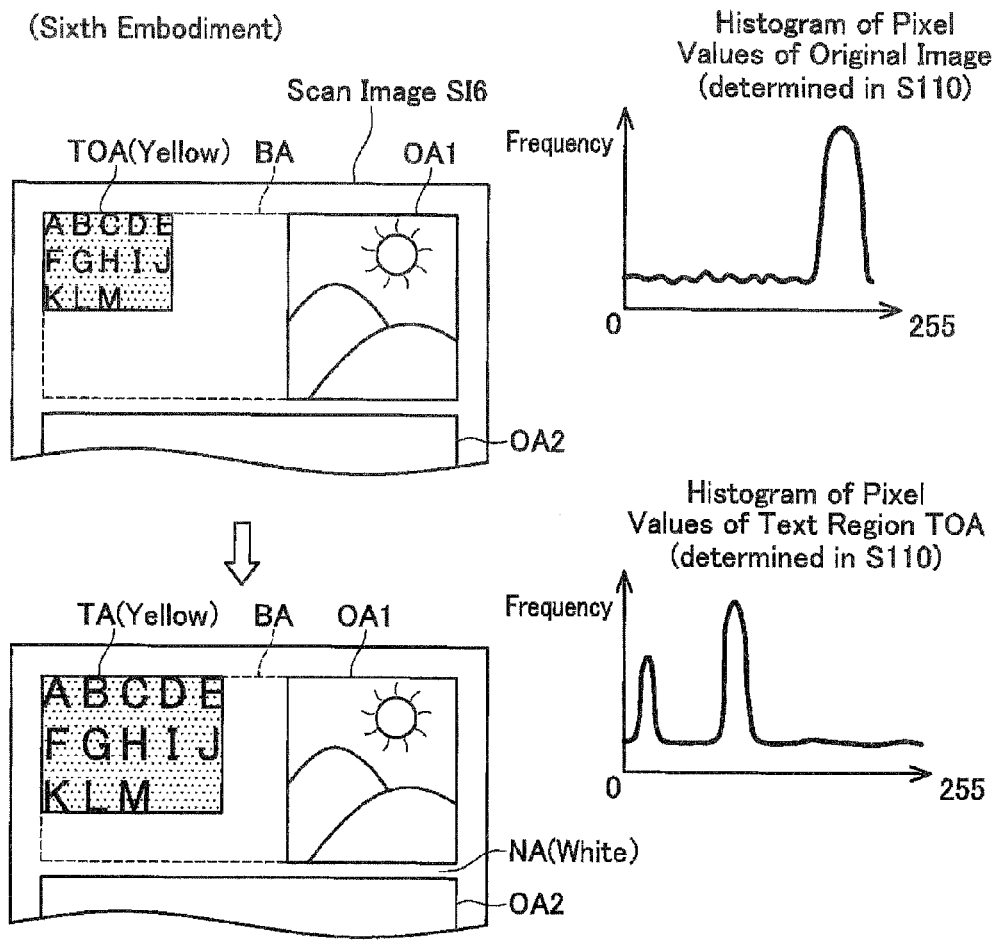
FIG. 17 shows an explanatory diagram for explaining a case satisfying a simple enlargement condition of a sixth embodiment.

Sixth Embodiment; FIG. 17

As shown in FIG. 17, the CPU 62 of the image processing server 50 judges in S300 whether or not a background color of the text region TOA differs from a background color of the scan image SI6.

In the letter string analyzing process of the present embodiment, the CPU 62 executes the processes of S110 to S150 similar to the letter string analyzing process of the first embodiment. In the binarizing process of S110, the most frequent pixel value indicating white color is determined as the background color. As a result, in the binary data BD, the respective pixels in the text region TOA indicate the pixel value "1", similar to the respective pixels in each of the picture objects OB1, OB2. Due to this, one unit region corresponding to the text object TOB is determined in the labelling process of S120 and the rectangular region determining process of S130.

Next, in the type determining process of S150, normally the frequencies of only two pixel values (e.g., brightness values) including a pixel value indicating black color and a pixel value indicating yellow color are larger than zero in the histogram corresponding to the object region TOA of the scan image SI6. Accordingly, the CPU 62 judges that the object regions TOA is a text region. However, since the respective pixels in the text region TOA are of the pixel value "1", no band-shaped region is determined in S160.

In S200, in a case where all of the pixels in the text region TOA are of the pixel value "1" in the binary data BD generated in S110, the CPU 62 judges that the background color of the text region TOA differs from the background color of the scan image SI6 (YES to S300) and executes the simple enlargement process. On the other hand, in a case where pixels with the pixel value "0" are included in the text region TOA in the binary data BD generated in S110, the CPU 62 judges that the background color of the text region TOA is the same as the background color of the scan image SI6 (NO to S300) and executes the processes of S500 and thereafter. In the simple enlargement process, the CPU 62 generates the enlarged image data by executing processes similar to the first embodiment.

For example, to make the title of presentation materials stand out, the background color of the text region TOA is sometimes changed. In this case, if the layout of the plurality of letters included in the text object TOB is changed, the layout may be changed against the intention of the creator of the document. In the present embodiment, the simple enlargement process is executed without changing the layout of the plurality of letters included in the text object TOB when the background color of the text region TOA differs from the background color of the scan image SI6. As a result, the layout can be prevented from being changed against the intention of the creator.

In the present embodiment, the configuration that judges whether to execute the simple enlargement process or to execute the processes of S500 and thereafter based on whether or not the background color of the text region TOA differs from the background color of the scan image SI16 is an example of "judging whether to execute a first type of enlarging process or execute a second type of enlarging process based on M lines of letter strings". Further, this configuration can be said as being "judging whether to execute a first type of enlarging process or execute a second type of enlarging process based on the characteristic of M lines of letter strings (or characteristic of the text object) (i.e., the background color of the text region TOA in the present embodiment)".

In the present embodiment, the brightness value is exemplified as the pixel value for judging the background color. However, the pixel value for judging the background color does not have to be the brightness value. For example, the pixel value for judging the background color may be a value of at least one color among RGB. For example, in S200, the CPU 62 may generate a histogram showing a distribution of frequency of R values of the plurality of pixels in the scan image data SID, and may specify the R value having the largest frequency. Then, the CPU 62 may judge that the background color of the text region TOA differs from the background color of the scan image SI16 in a case where two R values as specified are equal to or greater than a threshold (e.g., 100) (YES to S300), and in a case where the specified two R values are less than the threshold (NO to S300), it may judge that the background color of the text region TOA is the same as the background color of the scan image S16.

Figure 18:
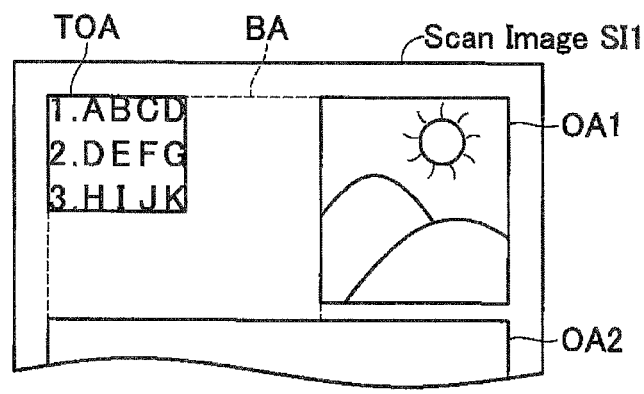
FIG. 18 shows an explanatory diagram for explaining a case satisfying a simple enlargement condition of a first variant.

(Variant 1) In the third embodiment as above, the image processing server 50 judged whether the itemized form is used by using the fore end high frequency ranges FH1 to FH4 positioned at the fore ends in a progressing direction of sentences. However, for example, as shown in FIG. 18, in a case where the text object TOB is expressed in the itemized form, in which a first letter in each line is a number and a second letter is ".", the image processing server 50 may judge whether or not the itemized form is used similar to the third embodiment by using the high frequency range that is positioned second from the fore end in the progressing direction of sentences, from within the histograms generated for each of the band-shaped regions LA1 to LA4. The configuration of the present variant is an example of "judging whether or not M lines of letter strings are expressed in an itemized form by using M pieces of projected histograms".

(Variant 2) In the above embodiments, in a case where an execution instruction for the color copy function is given from a user, the multi function peripheral 10 color may scan a sheet showing an image that is a scanning target (hereafter referred to as a "scan target sheet") to generate the scan image data SID, and may execute an OCR (abbreviation for Optical Character Recognition) to generate letter data indicating letters included in the text object TOB. The multi function peripheral 10 may send the generated scan image data SID and letter data to the image processing server 50. In this case, for example, in the third embodiment, the image processing server 50 may judge that the text object TOB is expressed in the itemized form in a case where "." is arranged at the head portion of each line, by using the letter data. The configuration of the present variant is an example of a configuration of "judging whether to execute a first type of enlarging process or execute a second type of enlarging process based on M lines of letter strings".

(Variant 3) In the second embodiment, the image processing server 50 executed image processing (i.e., the processes of S100 to S800 in FIGS. 2, 3) on the scan image data SID to generate the processed image data PID, and sent the processed image data PID to the multi function peripheral 10 (S900). As an alternative to this, the multi function peripheral 10 may execute the image processing on the scan image data SID to generate the processed image data PID (i.e., the image processing server 50 does not have to be present). In this variant, the multi function peripheral 10 is an example of an "image processing device".

(Variant 4) The process subject of the image processing executed by the image processing server 50 does not have to be the scan image data SID, and it may be data generated by document creation software, table editor software, illustration software and the like. That is, "original image data" herein is not limited to data obtained by scanning the scan target sheet, and may be other types of data.

(Variant 5) The processed image data PID does not have to be data to be used in printing by the multi function peripheral 10, for example, it may be data to be used for display purposes. Generally speaking, the processed image PI indicated by the processed image data PID simply needs to be an image that can be outputted (including printing, display, and the like).

(Variant 6) In the above embodiments, the scan image SI includes letter strings in which sentences progress from left to right in the horizontal direction, and sentences progress from top downward in the vertical direction (i.e., laterally written letter strings). As an alternative to this, the scan image SI may include letter strings in which sentences progress from top downward in the vertical direction, and sentences progress from right to left in the horizontal direction (i.e., vertically written letter strings). In this case, the image processing server 50 normally cannot determine the band-shaped regions based on the projected histograms in the horizontal direction in S160 of FIG. 4. Due to this, the image processing server 50 further generates projected histograms in the vertical direction to determine the band-shaped regions. Thereafter, the image processing server 50 uses the vertical direction instead of the horizontal direction, and uses the horizontal direction instead of the vertical direction to execute the processes similar to those in the above embodiments. In this variant, the vertical direction and the horizontal direction are respectively an example of a "first direction" and a "second direction".

(Variant 7) In the above embodiments, the respective processes in FIG. 2 to FIG. 17 are facilitated by the CPU 62 of the image processing server 50 executing program 66 (i.e., software). As an alternative, at least one of the processes in FIG. 2 to FIG. 17 may be facilitated by hardware such as logic circuits.

What is claimed is:

1. An image processing device comprising:
one or more processors; and
a memory storing computer readable instructions,
wherein the computer readable instructions, when executed by the one or more processors, cause the image processing device to:
acquire original image data indicating an original image, the original image including M lines of letter strings (the M being an integer of 1 or more) configured of a plurality of letters; and
generate processed image data indicating a processed image by executing image processing on the original image data, the processed image having the plurality of letters expressed in an enlarged manner as compared to the original image,
the image processing includes:
judging whether to execute a first type of enlarging process or execute a second type of enlarging process based on the M lines of letter strings in the original image;
in a case of judging to execute the first type of enlarging process, executing the first type of enlarging process on the original image data to generate a first type of processed image data indicating a first type of processed image including the M lines of enlarged letter strings configured of the plurality of letters enlarged, the first type of enlarging process comprising:
a process to dispose the plurality of letters in the first type of processed image equal to a layout of the plurality of letters in the original image; and
a process to enlarge the plurality of letters of the original image; and
in a case of judging to execute the second type of enlarging process, executing the second type of enlarging process on the original image data to generate a second type of processed image data indicating a second type of processed image including N lines of enlarged letter strings (N being an integer of 1 or more) configured of the plurality of letters enlarged, the second type of enlarging process comprising:
a process to dispose the plurality of letters in the second type of processed image in a different layout from the layout of the plurality of letters in the original image; and
a process to enlarge the plurality of letters of the original image.

2. The image processing device according to claim 1, wherein
a number of letters in each line of the M lines of enlarged letter strings in the first type of processed image is equal to a number of letters in a corresponding line of the M lines of letter strings in the original image, and
a number of letters in a first line of the N lines of enlarged letter strings in the second type of processed image is different from a number of letters in a first line of the M lines of letter strings in the original image.

3. The image processing device according to claim 1, wherein
the judging includes judging whether the M is 1, or 2 or larger,
the judgment to execute the first type of enlarging process is made in a case of judging that the M is 1, and
the judgment to execute the second type of enlarging process is made in a case of judging that the M is 2 or larger.

4. The image processing device according to claim 1, wherein
the image processing further includes determining a space region encompassing a text region including the M lines of letter strings,
two or more letters align along a first direction in each of the M lines of letter strings,
the judging includes judging whether or not a predetermined condition is satisfied, the predetermined condition being that a first length, which is obtained by multiplying a length of the text region along the first direction by a target value that is larger than 1, is equal to or less than a length of the space region along the first direction, and a second length, which is obtained by multiplying a length of the text region along a second direction vertically intersecting the first direction by the target value, is equal to or less than a length of the space region along the second direction, the judgment to execute the first type of enlarging process is made in a case where the predetermined condition is satisfied, and the judgment to execute the second type of enlarging process is made in a case where the predetermined condition is not satisfied.

5. The image processing device according to claim 1, wherein the M being an integer of 2 or more, the judging includes judging whether or not the M lines of letter strings are expressed in an itemized form, the judgment to execute the first type of enlarging process is made in a case of judging that the M lines of letter strings are expressed in the itemized form, and the judgment to execute the second type of enlarging process is made in a case of judging that the M lines of letter strings are not expressed in the itemized form.

6. The image processing device according to claim 5, wherein two or more letters align along a first direction in each of the M lines of letter strings, a plurality of original pixels configuring the original image data includes a plurality of letter string pixels indicating the M lines of letter strings and a plurality of background pixels indicating a background of the M lines of letter strings, the judging includes generating M pieces of projected histograms corresponding to M pieces of letter string regions including the M lines of letter strings by using the original image data, so that whether or not the M lines of letter strings are expressed in the itemized form is judged by using the M pieces of projected histograms, and each of the M pieces of projected histograms is a histogram corresponding to a distribution of a frequency of the letter string pixels in a case of projecting respective original pixels configuring a corresponding letter string region along a second direction that vertically intersects with the first direction.

7. The image processing device according to claim 1, wherein the judging includes judging whether or not a specific letter is included in the M lines of letter strings, the judgment to execute the first type of enlarging process is made in a case of judging that the specific letter is included in the M lines of letter strings, the judgment to execute the second type of enlarging process is made in a case of judging that the specific letter is not included in the M lines of letter strings, and the specific letter is a letter having a size larger than a threshold set in accordance with a letter size of the plurality of letters.

8. The image processing device according to claim 1, wherein the M being an integer of 2 or more, two or more letters align along a first direction in each of the M lines of letter strings, the judging includes:

calculating a blank space length along the first direction between one end of one line of the letter strings and a boundary of a text region including the M lines of letter strings, for each of the M lines of letter strings; and judging whether or not a variation among M pieces of blank space lengths calculated for the M lines of letter strings is larger than a predetermined variation, the judgment to execute the first type of enlarging process is made in a case of judging that the variation among M pieces of blank space lengths is larger than the predetermined variation, and the judgment to execute the second type of enlarging process is made in a case of judging that the variation among M pieces of blank space lengths is equal to or less than the predetermined variation.

9. The image processing device according to claim 1, wherein a text region including the M lines of letter strings includes a background color, the judging includes judging whether or not the background color of the text region differs from a background color of the original image, the judgment to execute the first type of enlarging process is made in a case of judging that the background color of the text region differs from the background color of the original image, and the judgment to execute the second type of enlarging process is made in a case of judging that the background color of the text region is equal to the background color of the original image.

10. The image processing device according to claim 1, wherein the image processing further includes:

determining a plurality of object regions including a plurality of objects that is included in the original image, the plurality of object regions including a text region that includes the M lines of letter strings; and determining a space region that encompasses the text region, and that does not overlap with other object regions among the plurality of object regions, and the second type of enlarging process comprises:

a process to determine a target region having an aspect ratio different from an aspect ratio of the text region based on the space region; and a process to generate the second type of processed image data indicating the second type of processed image in which the N lines of enlarged letter strings are arranged in the target region.

11. The image processing device according to claim 1, wherein two or more letters align along a first direction in each of the M lines of letter strings, the image processing further includes determining a space region that encompasses a text region including the M lines of letter strings, the second type of enlarging process comprises:

a process to determine a target region having an aspect ratio different from an aspect ratio of the text region, based on two blank space lengths along the first direction and two blank space lengths along a second direction that vertically intersects the first direction between the text region and the space region; and a process to generate the second type of processed image data indicating the second type of processed image in which the N lines of enlarged letter strings are arranged in the target region.

12. The image processing device according to claim 1, wherein
the second type of enlarging process comprises a process to generate the second type of processed image data indicating the second type of processed image including a plurality of letters that configures the N lines of enlarged letter strings, the N lines being less than the M lines, and
a number of letters in a first line among the N lines of enlarged letter strings is greater than a number of letters in a first line among the M lines of letter strings.

13. The image processing device according to claim 1, wherein
the second type of enlarging process comprises a process to generate the second type of processed image data indicating the second type of processed image including a plurality of letters that configures the N lines of enlarged letter strings, the N lines being greater than the M lines, and
a number of letters in a first line among the N lines of enlarged letter strings is less than a number of letters in a first line among the M lines of letter strings.

14. The image processing device according to claim 1, wherein
an aspect ratio of a region including the M lines of enlarged letter strings in the first type of processed image is equal to an aspect ratio of a region including the M lines of letter strings in the original image, and
an aspect ratio of a region including the N lines of enlarged letter strings in the second type of processed image differs from the aspect ratio of the region including the M lines of letter strings in the original image.

15. The image processing device according to claim 1, wherein
the first type of enlarging process comprises a process to generate the first type of processed image data indicating the first type of processed image in which the plurality of letters in the original image is enlarged and objects other than the plurality of letters included in the original image are not enlarged by executing the first type of enlarging process.

16. The image processing device according to claim 1, wherein
the second type of enlarging process comprises a process to generate the second type of processed image data indicating the second type of processed image in which the plurality of letters in the original image is enlarged and objects other than the plurality of letters included in the original image are not enlarged by executing the second type of enlarging process.

17. A non-transitory computer-readable storage medium storing a computer program for an image processing device, wherein the computer program, when executed by one or more processors of the image processing device, causes the image processing device to:
acquire original image data indicating an original image, the original image including M lines of letter strings (the M being an integer of 1 or more) configured of a plurality of letters; and
generate processed image data indicating a processed image by executing image processing on the original image data, the processed image having the plurality of letters expressed in an enlarged manner as compared to the original image,
the image processing includes:
judging whether to execute a first type of enlarging process or execute a second type of enlarging process based on the M lines of letter strings in the original image;
in a case of judging to execute the first type of enlarging process, executing the first type of enlarging process on the original image data to generate a first type of processed image data indicating a first type of processed image including the M lines of enlarged letter strings configured of the plurality of letters enlarged, the first type of enlarging process comprising:
a process to dispose the plurality of letters in the first type of processed image equal to a layout of the plurality of letters in the original image; and
a process to enlarge the plurality of letter of the original image; and
in a case of judging to execute the second type of enlarging process, executing the second type of enlarging process on the original image data to generate a second type of processed image data indicating a second type of processed image including N lines of enlarged letter strings (N being an integer of 1 or more) configured of the plurality of letters enlarged, the second type of enlarging process comprising:
a process to dispose the plurality of letters in the second type of processed image in a different layout from the layout of the plurality of letters in the original image; and
a process to enlarge the plurality of letters of the original image.

18. An image processing method, comprising:
acquiring original image data indicating an original image, the original image including M lines of letter strings (the M being an integer of 1 or more) configured of a plurality of letters; and
generating processed image data indicating a processed image by executing image processing on the original image data, the processed image having the plurality of letters expressed in an enlarged manner as compared to the original image,
the image processing includes:
selecting one type of enlarging process from a plurality type of enlarging processes including a first type of enlarging process and a second type of enlarging process based on the M lines of letter strings in the original image; and
executing the selected one type of enlarging process, wherein the first type of enlarging process generates a first type of processed image data indicating a first type of processed image including the M lines of enlarged letter strings configured of the plurality of letters enlarged, and the first type of enlarging process comprises:
a process to dispose the plurality of letters in the first type of processed image equal to a layout of the plurality of letters in the original image;
a process to enlarge the plurality of letters of the original image,
wherein the second type of enlarging process generates a second type of processed image data indicating a second type of processed image including N lines of enlarged letter strings (N being an integer of 1 or more) configured of the plurality of letters enlarged, and the second type of enlarging process comprises:

a process to dispose the plurality of letters in the second type of processed image in a different layout from the layout of the plurality of letters in the original image; and a process to enlarge the plurality of letters of the original image.

\* \* \* \* \*